US006470386B1

(12) United States Patent
Combar et al.

(10) Patent No.: US 6,470,386 B1
(45) Date of Patent: Oct. 22, 2002

(54) INTEGRATED PROXY INTERFACE FOR WEB BASED TELECOMMUNICATIONS MANAGEMENT TOOLS

(75) Inventors: Curtis T. Combar, Woodland Park; Robert A. Pfister, Colorado Springs, both of CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,516

(22) Filed: Sep. 24, 1998

Related U.S. Application Data

(60) Provisional application No. 60/060,655, filed on Sep. 26, 1997.

(51) Int. Cl.[7] .............................................. G06F 15/173
(52) U.S. Cl. .......................................... 709/224; 705/40
(58) Field of Search ................................. 709/224, 223, 709/218, 217, 219, 229; 379/112, 201, 265, 114, 140; 713/151, 154; 705/63, 75, 40, 44, 77

(56) References Cited

U.S. PATENT DOCUMENTS

| 4,160,129 A |   | 7/1979  | Peyser et al.     |         |
|-------------|---|---------|-------------------|---------|
| 4,345,315 A |   | 8/1982  | Cadotte et al.    |         |
| 4,817,050 A |   | 3/1989  | Komatsu et al.    |         |
| 4,893,248 A |   | 1/1990  | Pitts et al.      | 705/400 |
| 4,972,504 A |   | 11/1990 | Daniel, Jr. et al.|         |
| 5,041,972 A |   | 8/1991  | Frost             |         |
| 5,075,771 A |   | 12/1991 | Hashimoto         |         |
| 5,131,020 A | * | 7/1992  | Liebesny et al.   | 379/59  |
| 5,136,707 A |   | 8/1992  | Block et al.      |         |
| 5,223,699 A |   | 6/1993  | Flynn et al.      |         |
| 5,228,076 A |   | 7/1993  | Hopner et al.     |         |

(List continued on next page.)

FOREIGN PATENT DOCUMENTS

| EP | 0 809 387 A2 | 5/1997 |
| JP | 9064870 A    | 3/1997 |
| WO | WO97/11443   | 3/1997 |
| WO | WO97/16911   | 5/1997 |
| WO | WO 97/23988  | 7/1997 |
| WO | WO 98/19472  | 5/1998 |
| WO | WO 99/01826  | 1/1999 |

OTHER PUBLICATIONS

Jainschigg, Billing confirmed Sep. 1994, Teleconnect, vol. 12, No. 9, p. 39(4).*

"HP and Cicso Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

(List continued on next page.)

Primary Examiner—Robert B. Harrell
Assistant Examiner—Bunjob Jaroenchonwanit

(57) ABSTRACT

A Web/Internet based monitoring system provides a common GUI enabling the requesting and real-time viewing of telecommunication network traffic and statistical data pertaining to a customer's telecommunication network. Such a monitoring system includes: a client browser application located at a client workstation for enabling interactive Web based communications between a customer and the monitoring system; at least one secure server for managing client sessions over the Internet via one or more secure connections; a device for generating statistical data based on real-time call data obtained from a telecommunications network, the statistical data being generated according to a pre-defined user profile; a mechanism for periodically retrieving the statistical data according to the user profile and for integrating the retrieved statistical data within a Web page for presentation to the user over a secure socket connection at pre-defined intervals. The Web page is updated to contain the latest generated statistical data each interval.

17 Claims, 21 Drawing Sheets

U.S. PATENT DOCUMENTS

| | | | |
|---|---|---|---|
| 5,245,533 A | 9/1993 | Marshall | |
| 5,262,760 A | 11/1993 | Iwamura et al. | |
| 5,285,494 A | 2/1994 | Sprecher et al. | |
| 5,287,270 A | 2/1994 | Hardy et al. | 705/34 |
| 5,313,598 A | 5/1994 | Yamakawa | |
| 5,315,093 A | 5/1994 | Stewart | |
| 5,325,290 A | 6/1994 | Cauffman et al. | 705/34 |
| 5,327,486 A * | 7/1994 | Wolff et al. | 379/96 |
| 5,361,259 A | 11/1994 | Hunt et al. | |
| 5,369,571 A | 11/1994 | Metts | |
| 5,452,446 A | 9/1995 | Johnson | 707/1 |
| 5,475,836 A | 12/1995 | Harris et al. | |
| 5,481,542 A | 1/1996 | Logston et al. | |
| 5,483,596 A | 1/1996 | Rosenow et al. | |
| 5,490,060 A | 2/1996 | Malec et al. | |
| 5,491,779 A | 2/1996 | Bezjian | |
| 5,526,257 A | 6/1996 | Lerner | |
| 5,530,744 A | 6/1996 | Charalambous et al. | |
| 5,537,611 A | 7/1996 | Rajagopal et al. | |
| 5,539,734 A | 7/1996 | Burwell et al. | |
| 5,548,726 A | 8/1996 | Pettus | |
| 5,551,025 A | 8/1996 | O'Reilly et al. | |
| 5,555,290 A | 9/1996 | McLeod et al. | |
| 5,563,805 A | 10/1996 | Arbuckle et al. | |
| 5,566,351 A * | 10/1996 | Crittenden et al. | 395/867 |
| 5,586,260 A | 12/1996 | Hu | |
| 5,602,918 A | 2/1997 | Chen et al. | 380/21 |
| 5,610,915 A | 3/1997 | Elliott et al. | |
| 5,621,727 A | 4/1997 | Vaudreuil | |
| 5,623,601 A | 4/1997 | Vu | |
| 5,630,066 A | 5/1997 | Gosling | |
| 5,649,182 A | 7/1997 | Reitz | |
| 5,650,994 A | 7/1997 | Daley | |
| 5,659,601 A | 8/1997 | Cheslog | |
| 5,666,481 A | 9/1997 | Lewis | |
| 5,671,354 A | 9/1997 | Ito et al. | |
| 5,689,645 A | 11/1997 | Schettler et al. | |
| 5,692,030 A | 11/1997 | Teglovic et al. | |
| 5,692,181 A | 11/1997 | Anand et al. | |
| 5,694,546 A | 12/1997 | Reisman | |
| 5,696,906 A | 12/1997 | Peters et al. | |
| 5,699,403 A | 12/1997 | Ronnen | |
| 5,699,528 A * | 12/1997 | Hogan | 395/240 |
| 5,706,502 A | 1/1998 | Foley et al. | |
| 5,708,780 A | 1/1998 | Levergood et al. | |
| 5,710,882 A | 1/1998 | Svennevik et al. | |
| 5,721,908 A | 2/1998 | Lagarde et al. | |
| 5,721,913 A | 2/1998 | Ackroff et al. | |
| 5,727,129 A | 3/1998 | Barrett et al. | |
| 5,734,709 A | 3/1998 | DeWitt et al. | |
| 5,734,831 A | 3/1998 | Sanders | |
| 5,742,762 A | 4/1998 | Scholl et al. | |
| 5,742,763 A | 4/1998 | Jones | |
| 5,742,768 A | 4/1998 | Gennaro et al. | |
| 5,742,905 A | 4/1998 | Pepe et al. | |
| 5,745,754 A | 4/1998 | Lagarde et al. | |
| 5,754,830 A | 5/1998 | Butts et al. | |
| 5,757,900 A | 5/1998 | Nagel et al. | |
| 5,764,756 A | 6/1998 | Onweller | |
| 5,768,501 A | 6/1998 | Lewis | |
| 5,774,660 A | 6/1998 | Brendel et al. | 709/201 |
| 5,778,178 A | 7/1998 | Arunachalam | |
| 5,778,377 A | 7/1998 | Marlin et al. | |
| 5,781,550 A | 7/1998 | Templin et al. | |
| 5,781,632 A | 7/1998 | Odom | |
| 5,787,160 A | 7/1998 | Chaney et al. | |
| 5,787,412 A | 7/1998 | Bosch et al. | |
| 5,790,780 A | 8/1998 | Brichta et al. | |
| 5,790,789 A | 8/1998 | Suarez | |
| 5,790,797 A | 8/1998 | Shimada et al. | 709/224 |
| 5,790,809 A | 8/1998 | Holmes | |
| 5,793,762 A | 8/1998 | Penners et al. | |
| 5,793,964 A | 8/1998 | Rogers et al. | |
| 5,796,393 A | 8/1998 | MacNaughton et al. | |
| 5,799,154 A | 8/1998 | Kuriyan | 709/223 |
| 5,802,320 A | 9/1998 | Baehr et al. | |
| 5,805,803 A | 9/1998 | Birrell et al. | |
| 5,812,533 A | 9/1998 | Cox et al. | |
| 5,812,654 A | 9/1998 | Anderson et al. | |
| 5,812,750 A * | 9/1998 | Dev et al. | 395/182.02 |
| 5,815,080 A | 9/1998 | Taguchi | |
| 5,815,665 A | 9/1998 | Teper et al. | |
| 5,819,225 A | 10/1998 | Eastwood et al. | |
| 5,819,271 A | 10/1998 | Mahoney et al. | |
| 5,825,769 A * | 10/1998 | O'Reilly et al. | 370/360 |
| 5,826,029 A | 10/1998 | Gore, Jr. et al. | |
| 5,826,269 A | 10/1998 | Hussey | |
| 5,832,519 A | 11/1998 | Bowen et al. | |
| 5,835,084 A | 11/1998 | Bailey et al. | |
| 5,842,812 A | 12/1998 | Reeder | |
| 5,844,896 A | 12/1998 | Marks et al. | |
| 5,845,067 A | 12/1998 | Porter et al. | |
| 5,845,267 A | 12/1998 | Ronen | |
| 5,848,233 A | 12/1998 | Radia et al. | |
| 5,848,396 A | 12/1998 | Gerace | |
| 5,848,399 A | 12/1998 | Burke | |
| 5,850,517 A | 12/1998 | Verkler et al. | |
| 5,852,810 A | 12/1998 | Sotiroff et al. | |
| 5,862,325 A | 1/1999 | Reed et al. | |
| 5,867,495 A | 2/1999 | Elliott et al. | |
| 5,870,558 A * | 2/1999 | Branton et al. | 709/224 |
| 5,875,236 A | 2/1999 | Jankowitz et al. | |
| 5,877,759 A | 3/1999 | Bauer | |
| 5,881,237 A | 3/1999 | Schwaller et al. | |
| 5,883,948 A | 3/1999 | Dunn | |
| 5,884,032 A | 3/1999 | Bateman et al. | |
| 5,892,900 A | 4/1999 | Ginter et al. | |
| 5,907,681 A | 5/1999 | Bates et al. | |
| 5,909,679 A | 6/1999 | Hall | |
| 5,909,682 A | 6/1999 | Cowan et al. | |
| 5,915,001 A | 6/1999 | Uppaluru | |
| 5,920,542 A | 7/1999 | Henderson | |
| 5,923,016 A | 7/1999 | Fredregill et al. | |
| 5,930,764 A | 7/1999 | Melchione et al. | |
| 5,930,804 A * | 7/1999 | Yu et al. | 707/104 |
| 5,933,142 A | 8/1999 | LaStrange et al. | |
| 5,937,165 A | 8/1999 | Schwaller et al. | |
| 5,938,729 A | 8/1999 | Cote et al. | |
| 5,949,976 A | 9/1999 | Chappelle | |
| 5,953,389 A | 9/1999 | Pruett et al. | |
| 5,956,714 A | 9/1999 | Condon | |
| 5,958,016 A * | 9/1999 | Chang et al. | 709/229 |
| 5,960,411 A | 9/1999 | Hartman et al. | |
| 5,961,602 A | 10/1999 | Thompson et al. | |
| 5,963,925 A | 10/1999 | Kolling et al. | |
| 5,966,695 A | 10/1999 | Melchione et al. | |
| 5,970,467 A | 10/1999 | Alavi | |
| 5,974,396 A | 10/1999 | Anderson et al. | |
| 5,974,441 A | 10/1999 | Rogers et al. | |
| 5,982,864 A * | 11/1999 | Jagadish et al. | 379/115 |
| 5,982,891 A | 11/1999 | Ginter et al. | |
| 5,983,350 A | 11/1999 | Minear et al. | |
| 5,991,733 A | 11/1999 | Aleia et al. | |
| 5,991,746 A | 11/1999 | Wang | |
| 5,991,806 A | 11/1999 | McHann, Jr. | |
| 5,995,948 A | 11/1999 | Whitford et al. | |
| 5,999,525 A | 12/1999 | Krishnaswamy et al. | |
| 5,999,965 A | 12/1999 | Kelly | |
| 5,999,972 A | 12/1999 | Gish | |
| 5,999,973 A | 12/1999 | Glitho et al. | |
| 6,003,079 A | 12/1999 | Friedrich et al. | |

| | | |
|---|---|---|
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,044,144 A | 3/2000 | Becker et al. |
| 6,044,362 A | 3/2000 | Neely |
| 6,049,602 A | 4/2000 | Foladare et al. |
| 6,049,789 A * | 4/2000 | Smorodinsky ............... 705/40 |
| 6,052,450 A | 4/2000 | Allison et al. |
| 6,058,170 A | 5/2000 | Jagadish et al. |
| 6,058,381 A * | 5/2000 | Nelson ........................ 705/40 |
| 6,064,667 A | 5/2000 | Gisby et al. |
| 6,065,002 A | 5/2000 | Knotts et al. |
| 6,065,059 A | 5/2000 | Shieh et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A * | 7/2000 | Wood et al. ................ 379/201 |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A * | 9/2000 | Taskett ........................ 379/144 |
| 6,115,693 A | 9/2000 | McDonough et al. |
| 6,115,737 A | 9/2000 | Ely et al. |
| 6,119,109 A * | 9/2000 | Muratani et al. ........... 705/400 |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A | 10/2000 | Voit et al. |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. ................. 709/203 |
| 6,161,128 A | 12/2000 | Smyk |
| 6,173,311 B1 | 1/2001 | Hassett et al. |
| 6,205,456 B1 | 3/2001 | Nakao |
| 6,212,506 B1 * | 4/2001 | Shah et al. ................. 705/418 |
| 6,212,558 B1 | 4/2001 | Antur et al. |
| 6,240,450 B1 | 5/2001 | Sharples et al. |
| 6,253,239 B1 | 6/2001 | Shklar et al. |
| 6,286,050 B1 | 9/2001 | Pullen et al. |
| 6,292,481 B1 | 9/2001 | Voit et al. |
| 2001/0001014 A1 | 5/2001 | Akins, III et al. |

OTHER PUBLICATIONS

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," © Jul. 1998 and "Release Notes for Netflow FlowAnalyzer Release 1.0" © Sep. 1997.

HP Invent, "Capturing the Usage Billing Advantage", Copyright 1994–2001, Hewlett Packard http://www.hp.com/communications/usage/infolibrary/whitepapers/dsforum print.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1—s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Meteorology; Databases, "Inforonics offers controlled access to Web Meteorology", Information Today, Apr. 97, vol. 14 Issue 4, p53, 2p. This article reports that Inforonics has developed a controlled access gateway to MGA (Meteorological and Geoastrophysica).

Rosen,Michele, "BPCS steps into new millennium", Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communication Week*, May 2, 1994, p. 74.

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).

"New software platform enhances network management capabilities . . . ", *Business Wire*, Sep. 28, 1995 p. 9281122.

"User's Guide: Microsoft Access", Microsoft Corporation, 1994, pp. 378, 594, 599, 630–632 (13).

Morgan, Rick, "When Used Right, Internet can be Effective Marketing Tool", Madison Apital Times, Madison, WI, Nov. 8, 1996, extracted from *http://proquest.umi.com* on internet on Feb. 28, 2002.

Edwards, Morris, "The Electronic Commerce Juggernaut", Communication News, Nokomis, Sep. 1997, vol. 34, Issue 9, extracted from *http://proquest.umi.com* on Internet on Feb. 28, 2002.

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

"Cryptography and the Internet", *www.echonyc.com/~ysue/crypt.html*, 1995.

Lee et al., "Supporting Multi–User, Multi–Applet Workspaces in CBE", Computer Supported Cooperative Work 1996, Cambridge, MA.

"Netscape 2.0 Beta Hip or Hype?", *www.plant.net.au/innovations/20beta.html*, Planet Internet, 1995.

\* cited by examiner

FIG. 12(c)

Profile:SADB/MCIMAIL
Polling : 1 minute interval- Since 15:31 (MST) 21-Sep-1998 - Current 15:31 (MST) --> 15:33 (MST)

| | | ATTEMPTS | COMPLETES | INCOMPLETE | BLOCKED | NCR | AVERAGE DURATION | TOTAL DURATION |
|---|---|---|---|---|---|---|---|---|
| PROFILE TOTALS | Current: | 91 | 90 | 1 | 0 | 0 | 0.5 | 46.2 |
| | Totals: | 91 | 90 | 1 | 0 | 0 | 0.5 | 46.2 |
| 8004566245 | Current: | 85 | 84 | 1 | 0 | 0 | 0.5 | 42.7 |
| | Totals: | 85 | 84 | 1 | 0 | 0 | 0.5 | 42.7 |
| 8005766939 | Current: | 6 | 6 | 0 | 0 | 0 | 0.8 | 4.5 |
| | Totals: | 6 | 6 | 0 | 0 | 0 | 0.8 | 4.5 |

| | | INCOMPLETE | BUSY | ATB | SHORT CALL | | DIDN'T WAIT | DIDN'T ANSWER |
|---|---|---|---|---|---|---|---|---|
| INCOMPLETE TOTALS | Current: | 1 | 0 | 0 | 1 | | 0 | 0 |
| | Totals: | 1 | 0 | 0 | 1 | | 0 | 0 |
| 8004566245 | Current: | 1 | 0 | 0 | 1 | | 0 | 0 |
| | Totals: | 1 | 0 | 0 | 1 | | 0 | 0 |
| 8005766939 | Current: | 0 | 0 | 0 | 0 | | 0 | 0 |
| | Totals: | 0 | 0 | 0 | 0 | | 0 | 0 |

| | | BLOCKED | NETWORK CONGESTION | TAILOR CALL COVERAGE | ID CODES | | PAYPHONE BLOCKED |
|---|---|---|---|---|---|---|---|
| OTHER TOTALS | Current: | 0 | 0 | 0 | 0 | | 0 |
| | Totals: | 0 | 0 | 0 | 0 | | 0 |
| 8004566245 | Current: | 0 | 0 | 0 | 0 | | 0 |
| | Totals: | 0 | 0 | 0 | 0 | | 0 |
| 8005766939 | Current: | 0 | 0 | 0 | 0 | | 0 |
| | Totals: | 0 | 0 | 0 | 0 | | 0 |

Set Start Time | Set Poll Interval | List Profiles | Inquiry | Help | Exit

FIG. 12(f)

```
                                                                              689
                                                                             /
┌────────────────────────────────────────────────────────────────────────────────┐
│ File Edit View Go Favorites Help                                        _ □ X │
│ ⇦    ⇨      ⊗    ⟲       ⌂    🔍     ★                                        │
│ Back Forward Stop Refresh Home Search Favorites                               │
│ Address [https://tvsrfm.mci.com/main_menu_frames.asp                    ]     │
│ ┌──────────────────┐                                                          │
│ │ networkMCI Interact │           networkMCI★                                 │
│ └──────────────────┘                                                          │
│ 21-Sep-1998                       networkMCI Interact     Real-Time Inquiry   │
│ Inbound Number: 8004566245                                                    │
│ Time Range: 20-Sep-1998 15:30 (EST) --> 21-Sep-1998 15:37 (EST)               │
│                                                                    687        │
│                    CALL       CONN.                      CALL DNIS        ⌐   │
│ CALLING  COUNTRY/  CONNECT    TIME                       DISP. DIGITS OFLW CDR   EVS
│ NUMBER   STATE     DATE                 DURATION LOCATION                  DETAIL DETAIL
│ 2112737670  WA     20-SEP-1998 15:30    01:05    N1524897 CORP         0   cdr  evs
│ 2645678000  CA     20-SEP-1998 15:30    00:29    N1324897 CORP         0   cdr  evs
│ 2345678000  GA     20-SEP-1998 15:30    00:28    N0324897 CORP         0   cdr  evs
│ 2358442111  VA     20-SEP-1998 15:30    00:38    N0326897 CORP         0   cdr  evs
│ 4358542111  WY     20-SEP-1998 15:30    00:48    N0387897 CORP         0   cdr  evs
│ 2385599950  NE     20-SEP-1998 15:30    00:45    N0257897 CORP         0   cdr  evs
│ 2368599950  FL     20-SEP-1998 15:30    00:15    N1257897 CORP         0   cdr  evs
│ 4368389950  IL     20-SEP-1998 15:30    00:35    N0565797 CORP         0   cdr  evs
│ 7195986634  CO     20-SEP-1998 15:30    00:37    N1215897 CORP         0   cdr  evs
│ 7095932249  HI     20-SEP-1998 15:30    00:26    N0215897 CORP         0   cdr  evs
│ 7603710233  NC     20-SEP-1998 15:30    00:38    N0589797 CORP         0   cdr  evs
│ 7273106603  MA     20-SEP-1998 15:30    00:46    N0155897 CORP         0   cdr  evs
│ 7048478312  OR     20-SEP-1998 15:30    00:43    N0459797 CORP         0   cdr  evs
│ 4095944595  PA     20-SEP-1998 15:30    00:58    N1528797 CORP         0   cdr  evs
│ 4195986634  TX     20-SEP-1998 15:30    00:23    N0528797 CORP         0   cdr  evs
│                                                                                │
│         [Back to Polling] [List Profiles] [Help]    [Exit]                     │
│ ▫ Done                                              ▫ Internet Zone        // │
└────────────────────────────────────────────────────────────────────────────────┘

INTEGRATED PROXY INTERFACE FOR WEB BASED TELECOMMUNICATIONS MANAGEMENT TOOLS

CROSS-REFERENCE TO RELATED APPLICATIONS

The following patent application is based on and claims the benefit of U.S. Provisional Patent Application Ser. No. 60/060,655, filed Sep. 26, 1997.

FIELD OF THE INVENTION

The present invention relates generally to information delivery systems and, particularly, to a novel, WWW/Internet-based, real-time telecommunications network traffic monitoring service for customers of a telecommunications service provider.

BACKGROUND OF THE INVENTION

Currently, large telecommunications inter-exchange carrier enterprises such as AT&T, Sprint, MCI, etc., provide management and performance information relating to telecommunications, e.g., toll-free, networks. Such network management information generally includes details of network use and performance such as, for instance, real time status and alarm information, near real time performance data, traffic and usage statistics, etc. While this data may be available "on-line," they are typically communicated over dedicated network lines to a customer's location employing a dedicated computing platform, e.g., Unix operating system, and, in some cases, employing dumb terminals having a user interface. Often these systems require deployment of proprietary software, and, in some instances, the inter-exchange carrier enterprise requires customer's to purchase network monitoring hardware, which can be a very expensive proposition. Moreover, current network monitoring systems are limited in the types of services available for customers.

It would be highly desirable to provide a Web-based client-server application implementing a real-time monitoring function with the capability of communicating real-time network performance and statistical information relating to usage of their telecommunications network over the Internet to a client workstation having a Web browser.

SUMMARY OF THE INVENTION

The present invention is directed to a novel Intranet/Internet/Web-based monitoring system that enables a customer of a telecommunications service provider to request and view, in real-time, telecommunication network traffic and statistical data pertaining to that customer's inbound, toll free, and outbound telecommunications network traffic. Such a Intranet/Internet/Web-based monitoring system is a client-server application including: a client browser application located at a client workstation for enabling interactive Web based communications between a customer and the monitoring system; at least one secure server for managing client sessions over the Internet via one or more secure connections; a device for generating statistical data based on real-time call data obtained from a telecommunications network, the statistical data being generated according to a pre-defined user profile; and, a mechanism for periodically retrieving the statistical data according to the user profile and for integrating the retrieved statistical data within a Web based communication, e.g., Web-page, for presentation to the user over a secure connection at pre-defined intervals. The Web page is continuously updated to include the latest generated statistical data each interval.

The user profile comprises a specification of the telecommunications network phone numbers for which statistical data is to be generated, a polling interval specification, and the types of statistics to be generated per phone number. This profile is generated at the customer workstation via the integrated interface and communicated over the secure socket connection to the retrieving mechanism.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIGS. 12(a)–12(i) illustrate example screen displays illustrating the real-time monitoring (RTM) system functionality of the invention.

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, filed Sep. 24, 1998 entitled INTEGRATED CUSTOMER INTERFACE FOR WEB BASED COMMUNICATION NETWORK MANAGEMENT, the nMCI Interact system architecture is basically organized as a set of common components comprising the following.

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application U.S. Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
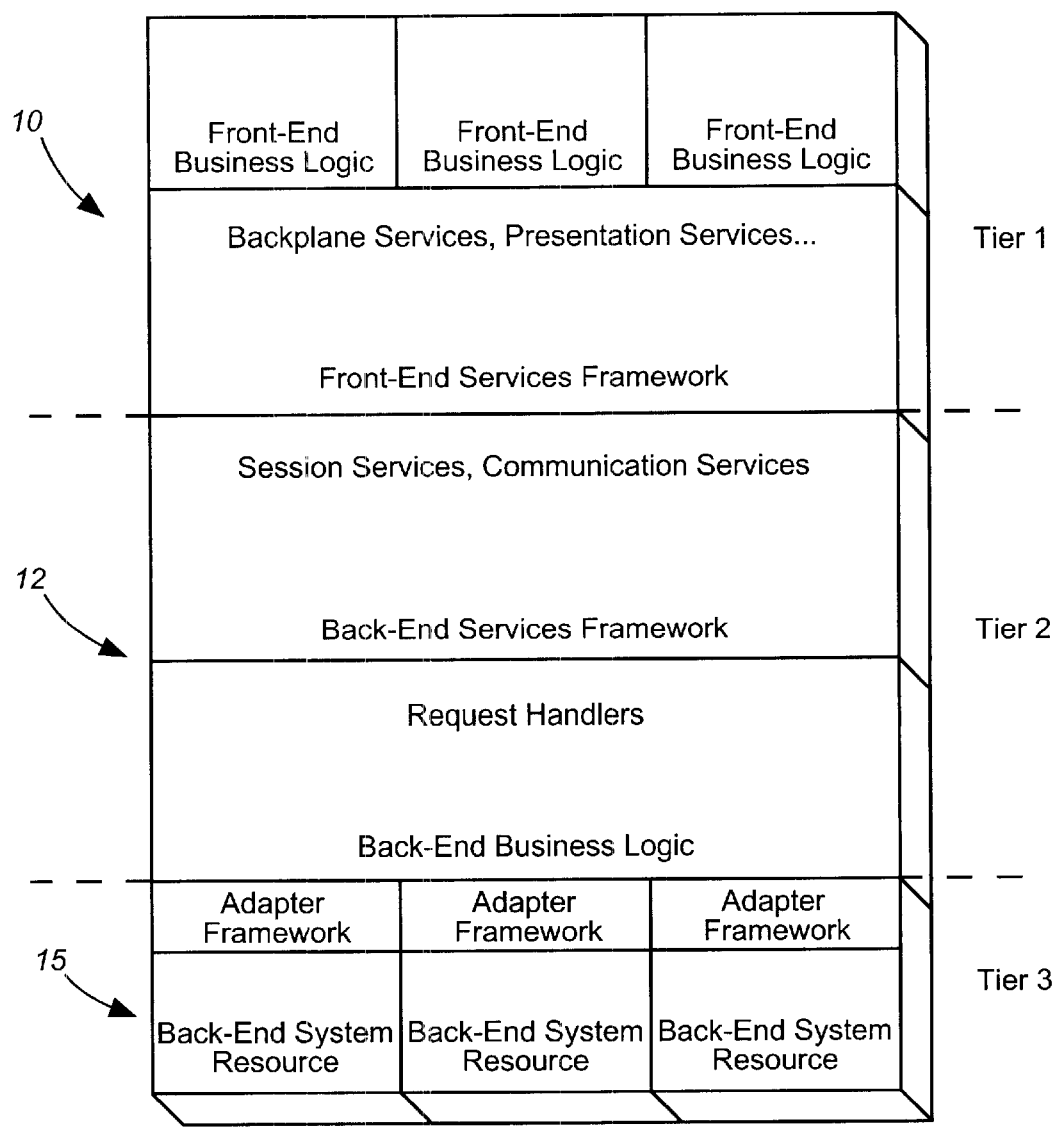
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in co-pending U.S. patent application Ser. No. 09/159,515, filed Sep. 24, 1998, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
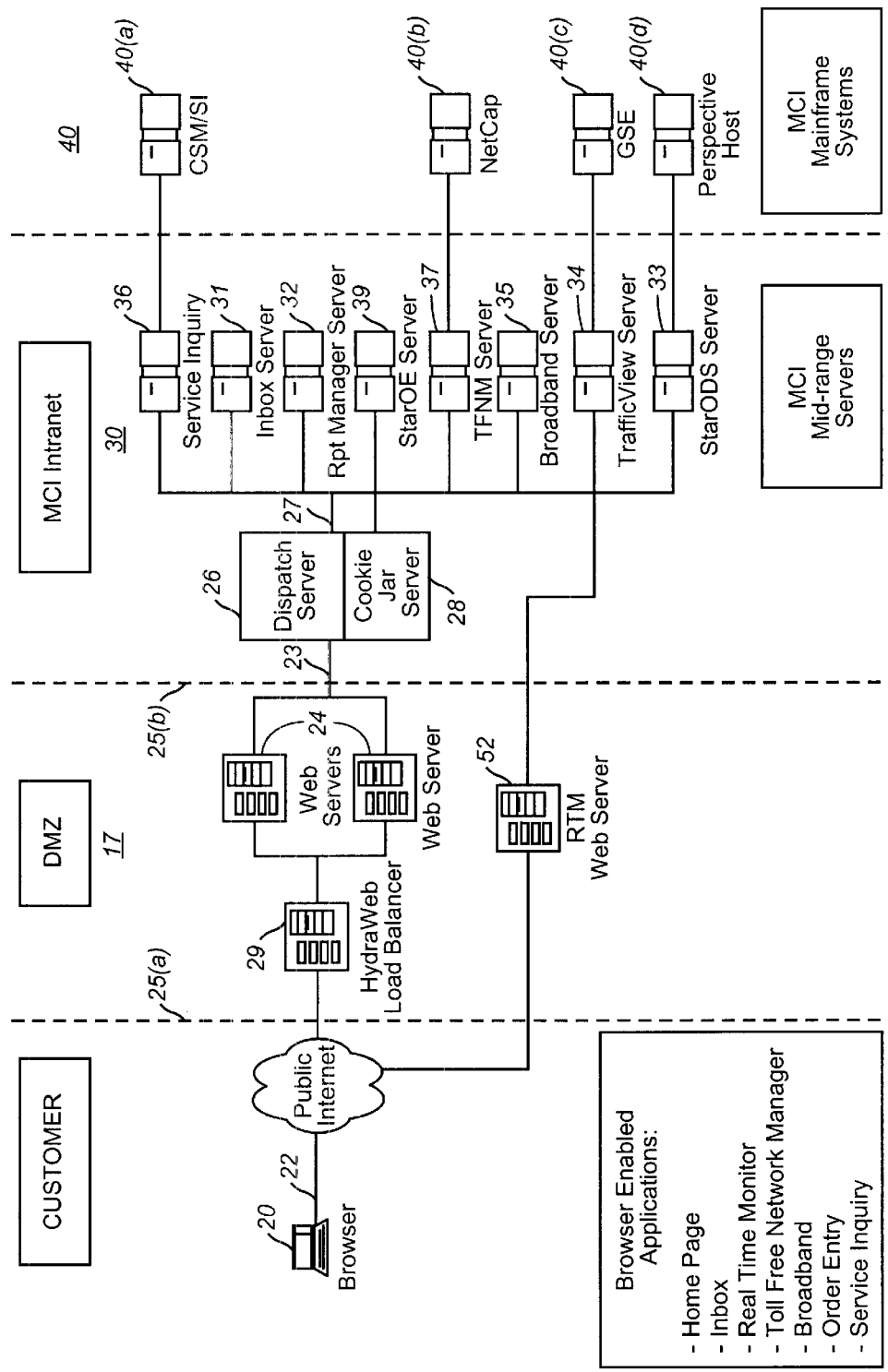
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
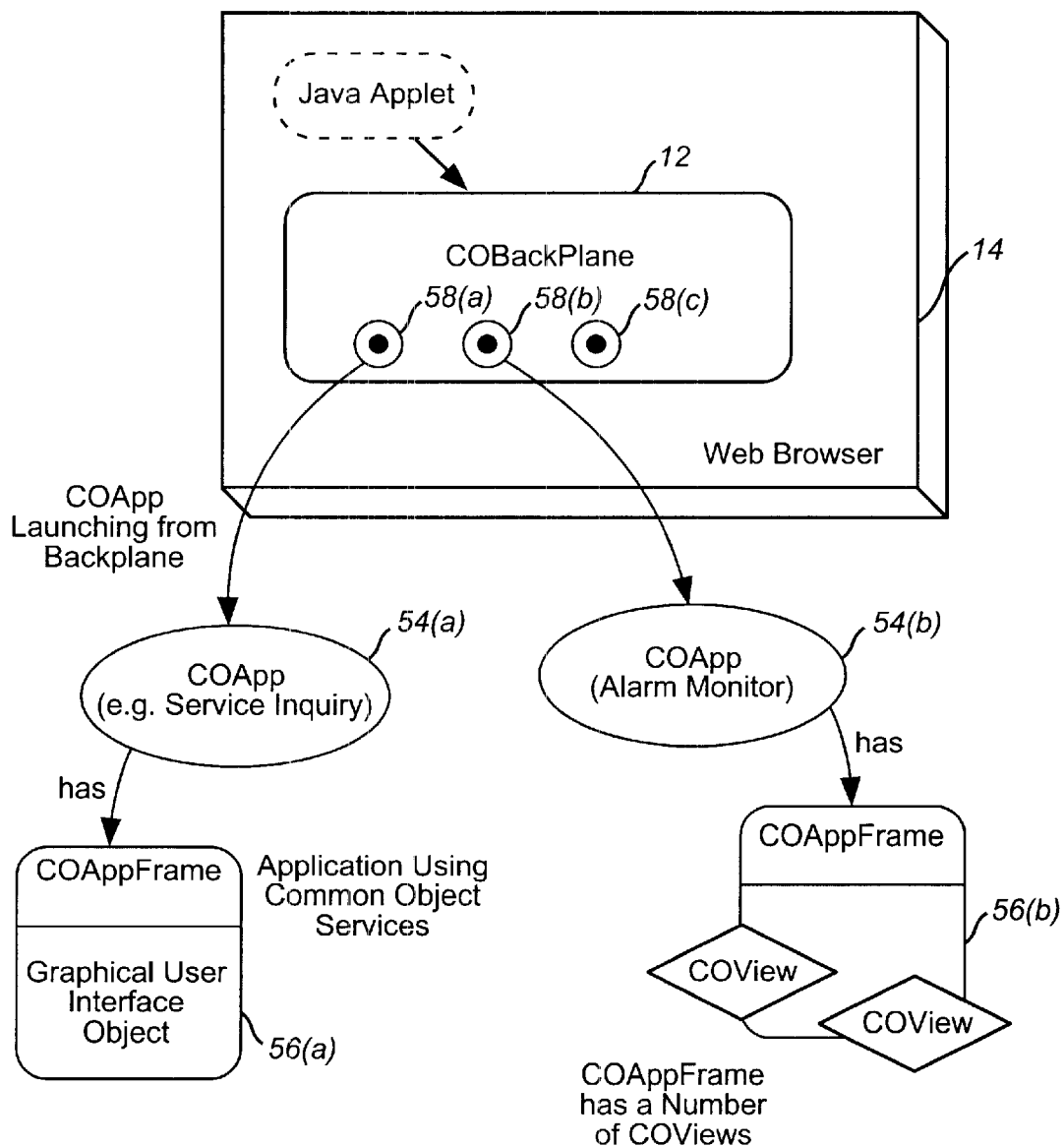
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515, filed Sep. 24, 1998, entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
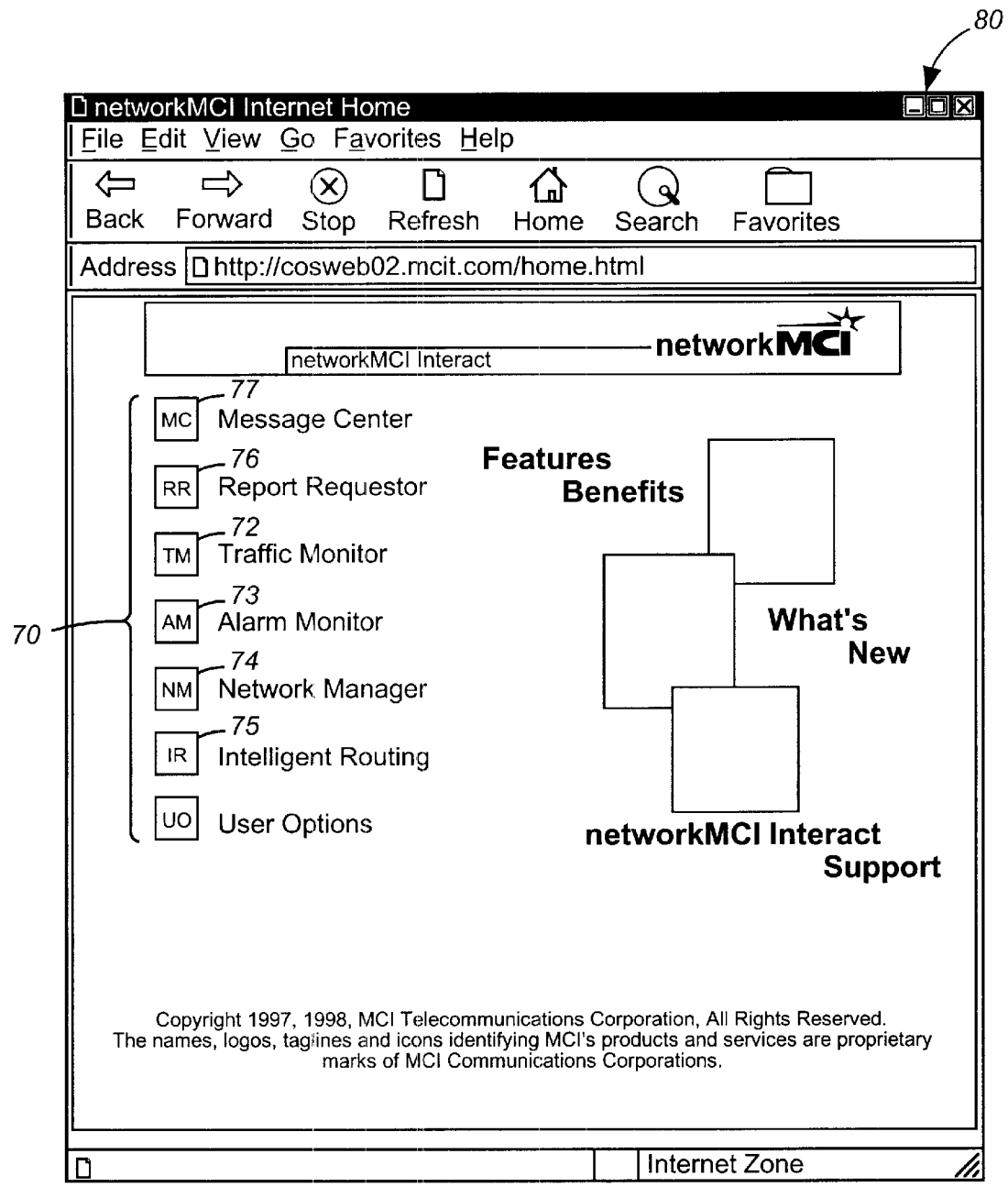
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.01 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The CoBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second connection 23 to the dispatch server 26 inside the enterprise Intranet.

As described in greater detail in co-pending U.S. patent application Ser. No. 09/159,514, filed Sep. 24, 1998, entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requester is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)–(d) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
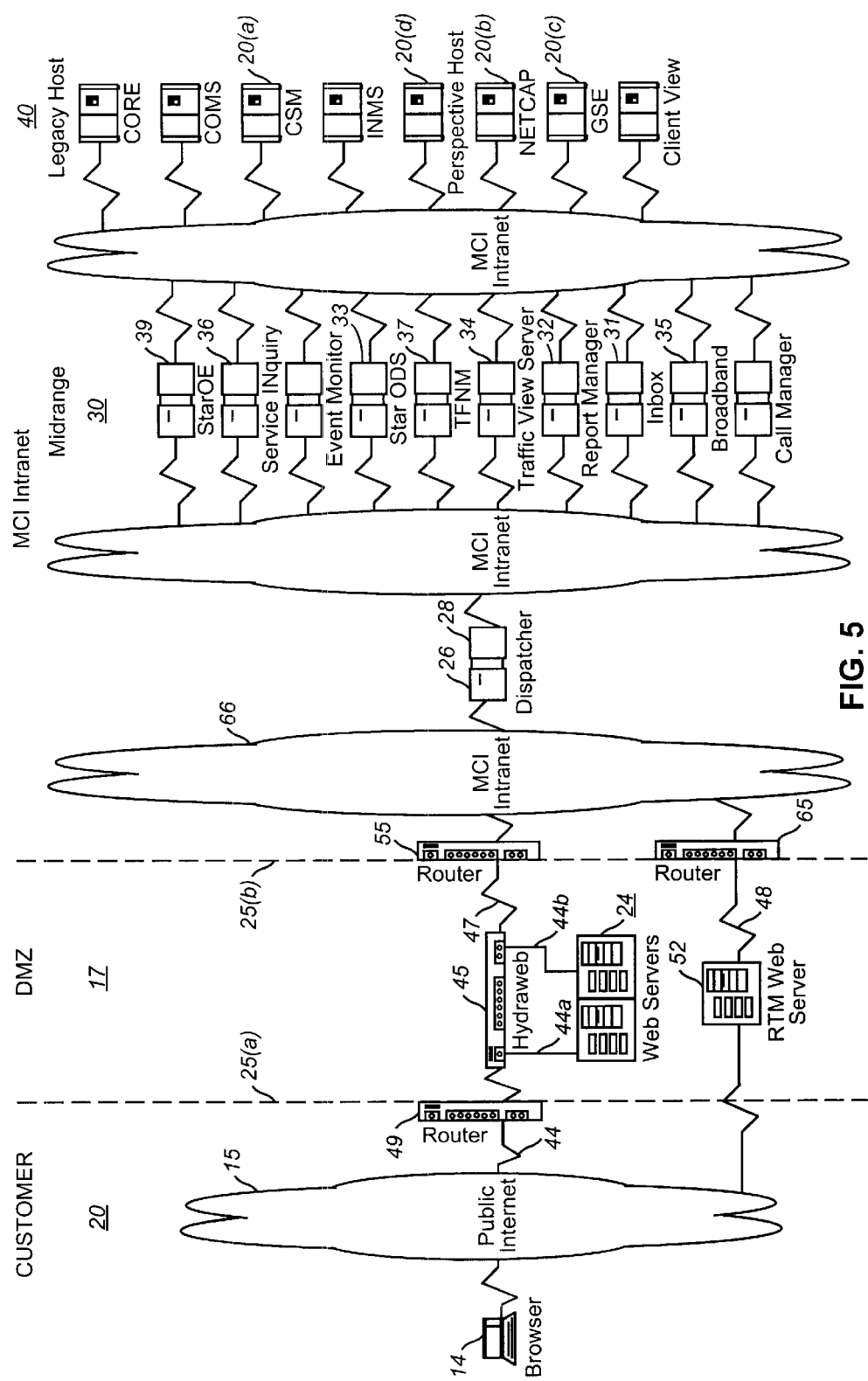
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25a, 25b. In the preferred embodiment, one of the firewalls 29 includes port specific filtering routers, which may only connect with a designated port address. For example, router 49 (firewall 25(a)) may connect only to the addresses set for the HydraWeb® (or web servers 24) within the DMZ, and router 55 (firewall 25(b)) may only connect to the port addresses set for the dispatch server 26 within the network. In addition, the dispatch server 26 connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet beyond the DMZ, thus ensuring internal company system security and integrity. Even with a stolen password, the hijacker may not connect to other ports, root directories or application servers within the enterprise system, and the only servers that may be sabotaged or controlled by a hacker are the web servers 24.

The DMZ 17 acts as a double firewall for the enterprise intranet because of the double layer of port specific filtering rules. Further, the web servers 24 located in the DMZ never store or compute actual customer sensitive data. The web servers only transmit the data in a form suitable for display by the customer's web browser. Since the DMZ web servers do not store customer data, there is a much smaller chance of any customer information being jeopardized in case of a security breach. In the preferred embodiment, firewalls or routers 47,49 are a combination of circuit gateways and filtering gateways or routers using packet filtering rules to grant or deny access from a source address to a destination address. All connections from the internal application servers are proxied and filtered through the dispatcher before reaching the web servers 24. Thus it appears to any remote site, that the connection is really with the DMZ site, and identity of the internal server is doubly obscured. This also prevents and direct connection between any external and any internal network or intranet computer.

The filtering firewalls 25(a), (b) may also pass or block specific types of Internet protocols. For example, FTP can be enabled only for connections to the In-Box server 31, and denied for all other destinations. SMTP can also be enabled to the In-Box server, but Telnet denied. The In-box server 31 is a store and forward server for client designated reports, but even in this server, the data and metadata are separated to further secure the data, as will be described.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB® unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb® unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the Hydraweb™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described herein, this RTM server provides real-time session management for subscribers of the networkMCI Interact Real Time Monitoring system. An additional TCP/IP connection 48 links the RTM Web server 52 with the MCI Intranet Dispatcher server 26. As further shown in FIG. 5, a third router 65 is provided for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second socket connection 23 to the dispatch server 26 inside the enterprise Intranet.

As described herein, and in greater detail in co-pending U.S. Patent Application Ser. No. 09/159,695, the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, filed Sep. 24, 1998, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Client View.

The present invention focuses on the client and middle-tier service and application proxy components that enable customers to view in real time the operation of their network, i.e., the statistics relating to inbound call traffic for customer's special service call number(s), e.g., toll-free 800/8xx and VNET calls, and may additionally support and may support outbound call traffic. Referred to herein as the Real Time Monitoring system ("RTM"), the invention enables a subscriber of a telecommunications network service to access, via a web-based browser interface, unpriced number usage and statistical information in real-time so that the ongoing operation of the network, at least with respect to the subscriber's special service call number(s), can be monitored by the subscriber. The subscriber may then, in the manner as described in commonly-owned, co-pending U.S. patent application Ser. No. 09/159,702, filed Sep. 24, 1998, entitled INTEGRATED PROXY INTERFACE FOR WEB BASED TELECOMMUNICATION TOLL-FREE NETWORK MANAGEMENT, the contents and disclosure of which is incorporated by reference as if fuilly set forth herein, expeditiously effect any necessary changes as required based on the real-time information provided. For example, depending upon current network traffic conditions, the customer may reallocate his resources by redirecting calls to a special service call number to different locations, e.g., where other operators of the subscriber are located.

Figure 6:
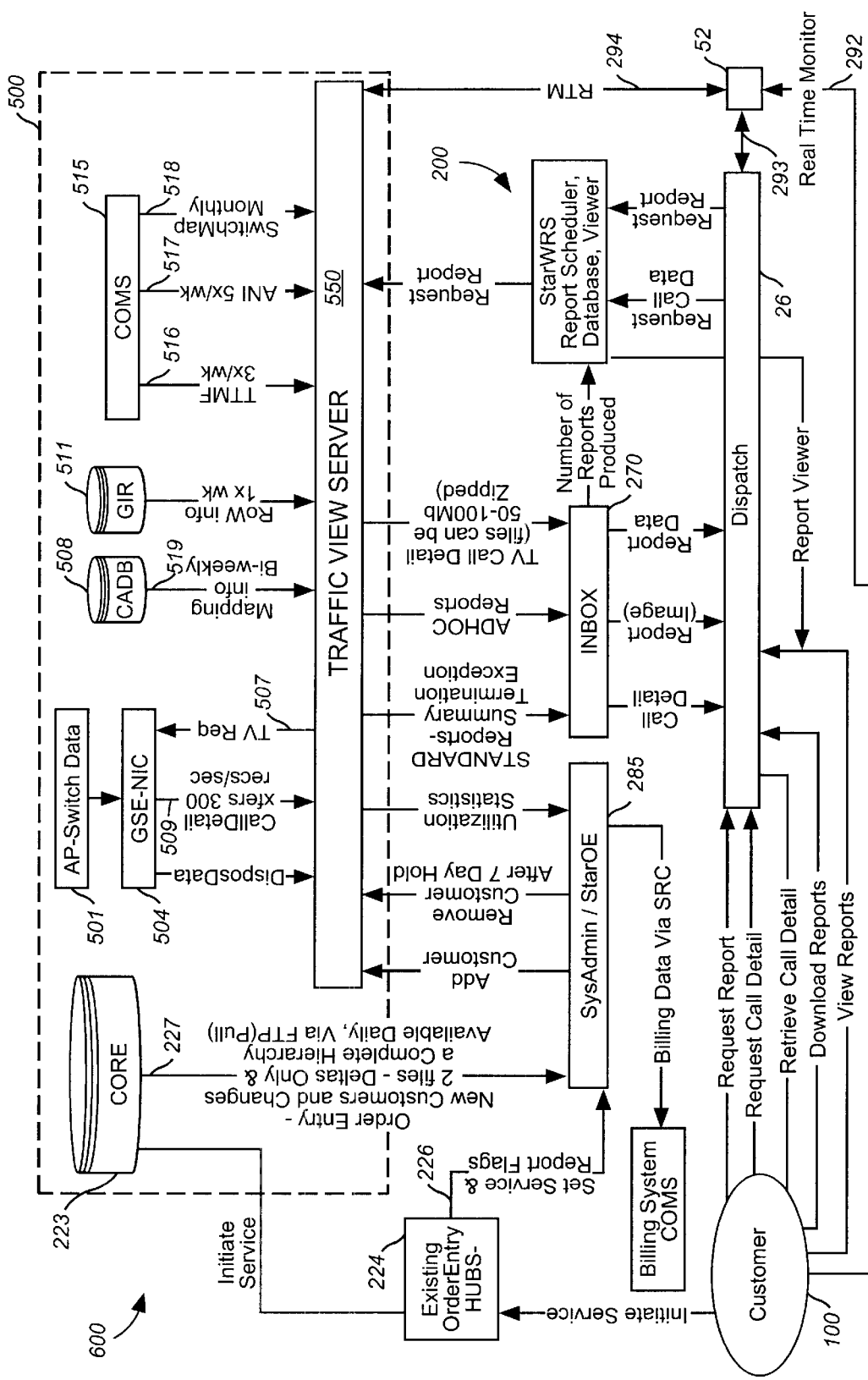
FIG. 6 illustrates the unpriced reporting component 500 for nMCI Interact Web-based reporting system.

FIG. 6 depicts the physical architecture of the RTM system 600. As shown in FIG. 6, the RTM system's real-time monitoring capability is enabled by the Intranet Traffic View system ("TVS"), depicted as dotted line 500 such as described in commonly owned, co-pending U.S. patent application Ser. No. 09/159,404 filed Sep. 24, 1998, entitled INTEGRATED PROXY INERFACE FOR WEB BASED DATA MANAGEMENT REPORTS, the contents and disclosure of which is incorporated by reference as if fully set forth herein. As will be described, the TVS system 500 includes a TVS server 550 invoking processes for monitoring and storing real-time call detail statistics data. Additionally, as shown in FIG. 6, the TVS system is shown integrated with the nMCI Interact "StarWRS" web reporting system 200 having a web-based client front-end with a TCP/IP socket communication infrastructure to enable secure customer access to reports comprising call detail statistical data. As described in commonly owned, co-pending U.S. patent application Ser. No. 09/159,409 filed Sep. 24, 1998, entitled PROXY SERVER INTERFACE FOR WEB BASED REPORT REQUESTOR TOOL SET, the contents and disclosure of which are incorporated by reference herein, the nMCI Interact system 200, inter alia, provisions customer's with the ability to fulfill all of their telecommunications network reporting requirements via a common Web-browser interface. The fulfillment finction provided by NMCI Interact and the TVS system 500 includes report customization, report scheduling and report editing functions for customer's unpriced reporting detail and statistical data, such as described in greater detail in co-pending U.S. patent application Ser. No. 09/159,404, filed Sep. 24, 1998.

More particularly, the Traffic View Server 550 functions to store network call detail records (CDRs) and statistics, generate reports and deliver reports and/or call detail to the customer via the StarWRS Web Reporting System, and, supplies on-line customer access to call detail and hourly statistics that aid the customer in Network management, call center management and customer calling pattern analysis. For real time (unpriced) data, statistics are generated for the following totals: minutes, attempts, completes, incompletes, other, dto (direct termination overflow), short calls, didn't wait, didn't answer, tcc, and equipment failures.

The process by which the TVS server 550 gets data is now explained in greater detail with reference to FIGS. 6 and 7. As shown, call records are created by a network switch 501. An AP (Adjunct processor) or Storage and Verification Elements ("SAVE") platform 502 is co-located with each switch and receives all the call records from the switch as soon as possible after a call disconnects. The AP/SAVE sends all the call records to a(Network Information Concentrator (NIC) 503 where records are grouped together and those groupings numbered for a more efficient network utilization. If the NIC determines that it is missing a gap in the numbers, it will request the AP/SAVE resend that group of data to ensure that no data is lost. Should the NIC be unavailable to receive data, the AP/SAVE queues the data for later delivery. The NIC 503 receives all calls from all switches as soon as possible after a call has disconnected (hangs up) and distributes records to clients that match a certain criteria.

A generalized statistics engine (GSE) component 504 receives all records that are considered to be a toll free (800/8xx, etc) call from the NIC and also employs the same sequencing of groups of records to ensure that no data is lost. Should the GSE be unavailable, the NIC will queue the data for later delivery. The GSE component 504 further filters toll-free calls to only process calls that match a subscriber list which is maintained by an order entry OE process on the GSE (not shown) that accepts add & delete requests from TVS via a messaging interface 507 as shown in FIG. 6. The GSE component then formats the CDRs, i.e., enhances the call records, from the form as originally provided at the switch, into a normalized form to allow for a common record format regardless of the type of switch that created the record, or the exact call record type. For example, different network switches generate different call detail records, e.g., call detail record, enhanced call detail records, etc., which denote differences in toll-free services and features. This type of call detail record generated by GSE component is herein referred to as a TCR (Translated Call Record).

Groups of TCRs are sent from the GSE to TVS via TCP/IP. When TVS has safely stored that record it sends an acknowledgment to the GSE 504 so that the GSE may dispose of the group. Should TVS not be available to receive data, GSE queues data to be sent later.

Figure 8:
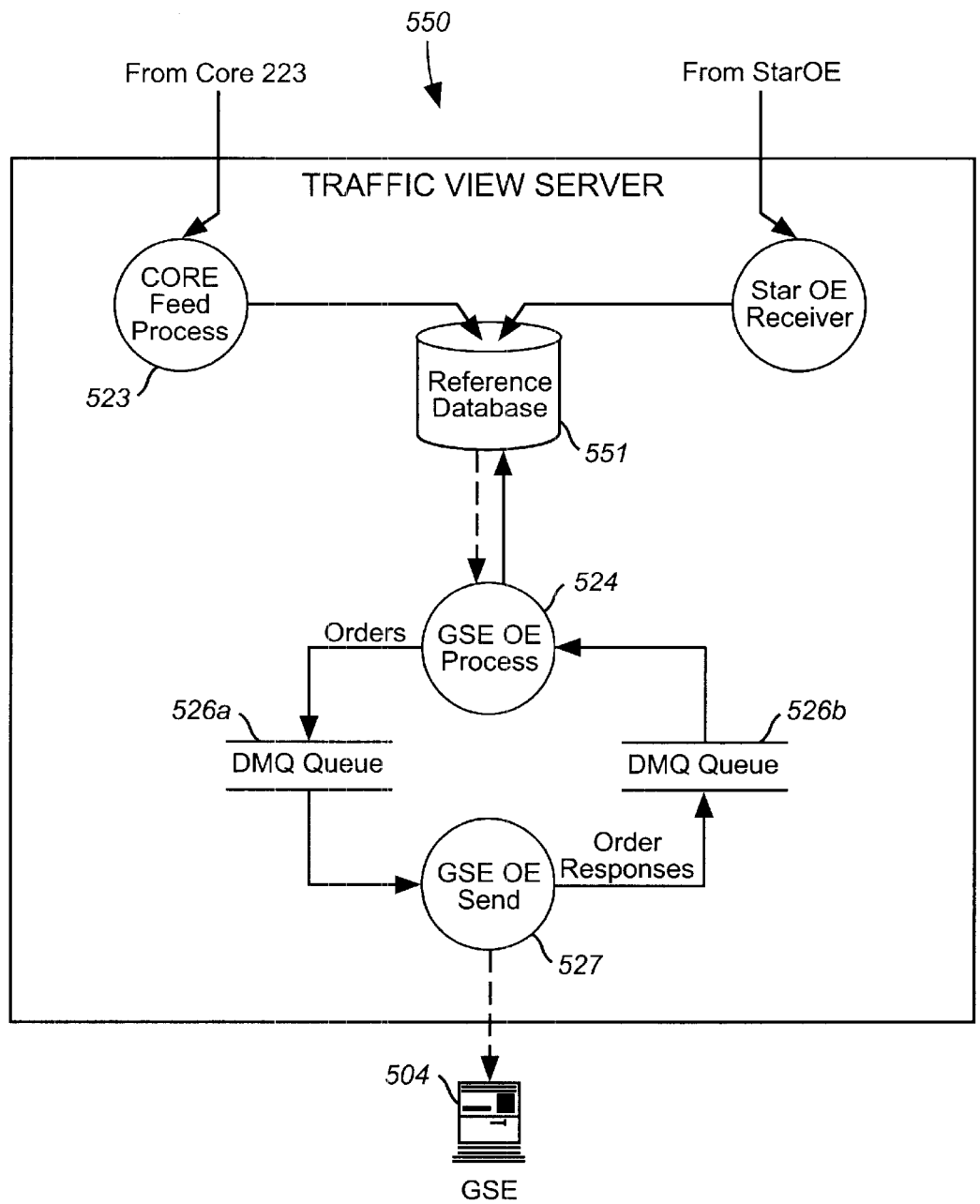
FIG. 8 is a detailed flow diagram depicting the internal TVS server processes for receiving customer TVS enablement data from order entry and CORE systems.

As shown in FIG. 6, in the preferred embodiment, initial customer provisioning occurs at either the Corporate Order Entry system 223 (CORE) or the StarOE server 285 component of MCI Interact. As shown in FIG. 8, CORE 223 transmits daily to the TVS server 550 via Network Data Mover (NDM) files which comprise information about new reports for TVS to create, and where to send those reports, e.g., FAX, E-Mail, or US Mail. In the NMCI Interact TrafficView Server 550, a CORE FEED process 523 provisions reporting order and profiles into a reference database 551, and sets up scheduled reports to work on the next boundary, e.g., hourly, daily reports at midnight the next complete day, weekly reports at the end of the next week, monthly reports at the end of the month, etc.. If this report requires Call detail records, as opposed to aggregated data, a CDR database is selected based on weighted values for the existing database. If a request contains a toll-free number that has not been provisioned with the GSE, a GSE_OE process 524 is invoked to forward the order, e.g., toll-free number, from the reference database onto a DEC Message Queues "DMQ" 526a. A GSE_OE_SEND process 527 is invoked to keep a TCP/IP socket open to the GSE process so that the pending order may be forwarded to the GSE 504 via a TCP/IP interface. Once the order has been provisioned in GSE the GSE may start to collect CDRs based on the requested toll-free number. In response, the GSE will invoke the GSE_OE_SEND process 527 to send an order response to a DMQ 526b, where it will be accessed by the GSE_OE process 524. The GSE_OE process 524, in turn, will confirm that the number has been provisioned within the TVS server and will update the reference database accordingly by removing the order from a pending order list. Invocation of the GSE_OE process and the GSE_OE_SEND process enables tracking of new customer orders, i.e., new toll-free network numbers for which CDR data is to be collected.

As further shown in FIGS. 6 and 8, in the preferred embodiment, requests to enable TrafficView customers are received in real-time from StarOE 285 via TCP/IP. Generally, StarOE specifies what general categories of reports can be requested for a given nMCI Interact subscriber. These categories include: 1) reports that only require data aggregation; 2) reports that require call detail records to be collected; and 3) real-time monitor (RTM) reports. This is provisioned into the reference database 551 for future verification of requests from the nMCI Interact platform. If a request contains a toll-free number that has not been provisioned with the GSE, a subscription request is sent to the GSE 504 to start collecting TrafficView data pertaining to that tollfree number. This request is sent by placing a request onto the DMQ queue 553, and the GSE_SEND_OE process 554 then forwards this request to the GSE 504 via a TCP/IP interface. In the preferred embodiment, the content and format of an "order entry" message generated by the TVS server for requesting unpriced traffic data from the GSE is provided in Appendix A. In accordance with this messaging, the GSE selects all TCR's for TVS enabled customers and places them in a SAVE storage queue, e.g., Versant or Talarian, for subsequent distribution to the TVS server.

As further shown in FIG. 6, an input feed from the calling area database component 508 ("CADB") provides the TVS server 550 with reference data including state and country information for mapping NPA/NXX (Numbering Plan Area/Number Exchange) to city name and state code, and, for mapping country codes to country names. Data is transported from the CADB database 508 to the TVS server via a network data mover ("NDM") or FTP via interface 519.

A further input feed from the Global Information Repository "GIR" component 511 provides the TVS server with International toll-free number terminations on a periodic basis.

From the circuit order management system ("COMS") component 515, TVS receives three NDM feeds: 1) a Trunk Type Master feed 516 used in Un-priced Reporting to map enhanced voice service/dedicated access line (EVS/DAL) information to specific service locations; 2) an automatic number identification ("ANI") feed 517 also used in Unpriced Reporting to map EVS/DAL information to specific service locations; and, 3) a switch mapping feed 518 to map the switch ID (per Network control system) to the billing representations of the same switch.

Figure 7:
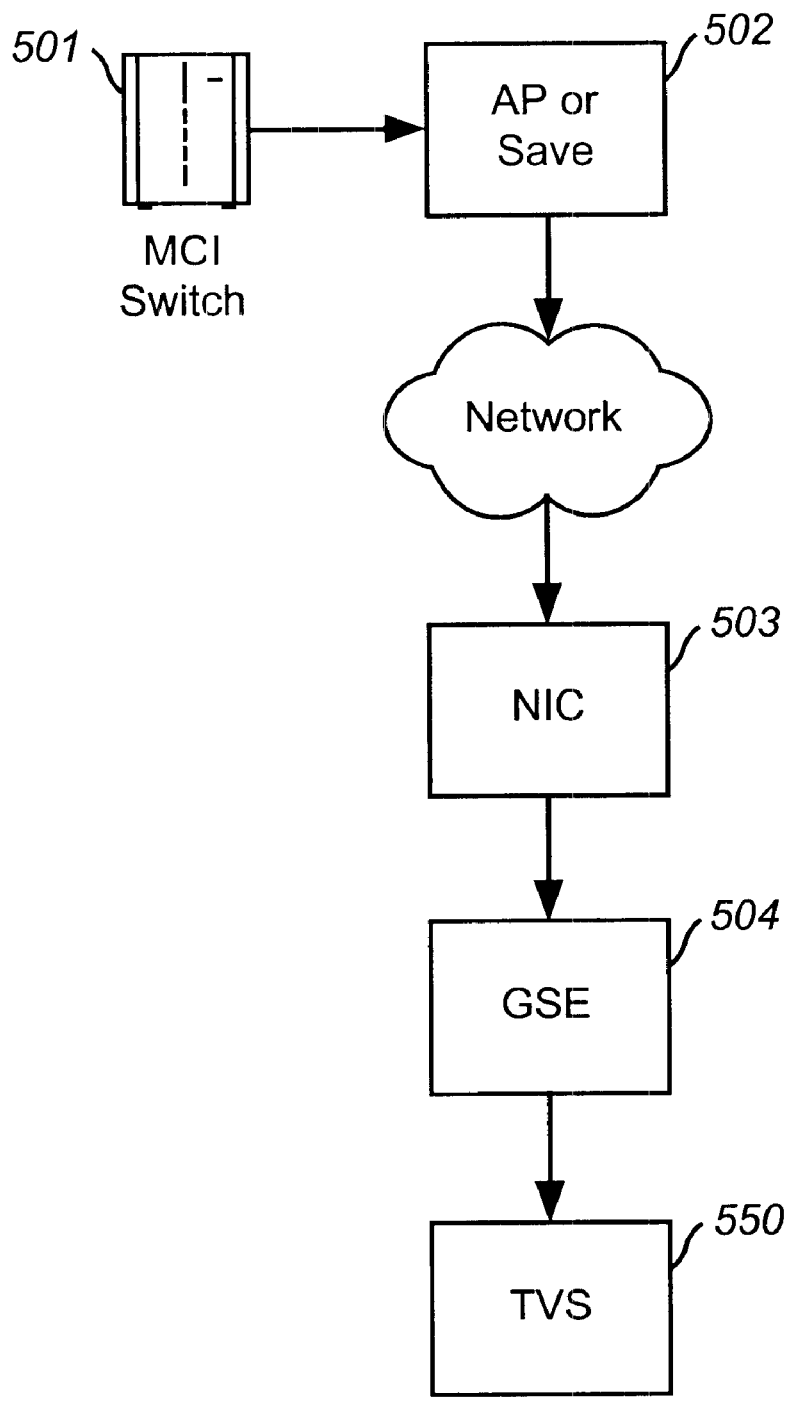
FIG. 7 is an general flow diagram of the process by which the TVS server 550 gets data.

As further shown in FIG. 7, the unpriced data collection process begins with the placement of an order for unpriced reporting with the customer's account team. Specifically, the account team places the order in real time using an ordering system component. In a periodic process, this order information is transmitted to OEHubs 224, e.g., via e-mail which later inputs the necessary service and reporting flags to the StarOE component 285, via messaging interface 226. The OEHubs 224 further adds new customers to the corporate order entry (SCOREN) system component 223, which provides customer billing hierarchy information used by the StarWRS system. The new customer hierarchy information is extracted by the CORE system 223, and is available for pickup by the StarOE server 285 via messaging interface 227.

The StarOE server 285 then messages the Traffic View Server 550 in real time via TCP/IP that the number has been added for Unpriced Reporting. The TVS additionally messages the GSE component 505 in real time to immediately initiate the collection of call detail for that number, as will be described in greater detail herein. Due to latency inherent in the fulfillment process, customers may select and receive daily reports after CDR collection begins.

In accordance with the invention, a wide variety of reports and reporting frequencies are available. In the preferred embodiment, reports are available in hourly, daily, weekly, and monthly frequencies. Types of TVS reports that are available to customers include: Standard reports; Summary reports; Termination Reports; Exception reports; and, unpriced call detail. For example, Standard reports that may be generated from stored Toll Free hourly statistics include, but are not limited to: Summary by Toll Free Number and Hour which is available in the following frequencies (Ad-hoc "A",Daily "D", Weekly "W", and Monthly "M"); Summary by Toll Free Number and Date(A,D,W,M); Summary by Toll Free Number and day of week ("DOW") (A,W,M); Summary by Toll Free Number and Week (A,M); Summary by Toll Free Number and NPA (A,D,W,M); Summary by Toll Free Number, Service Location and Hour(A,D,W,M); Summary by Toll Free Number, Service Location and Date (A,D,W,M); Summary by Toll Free Number, Service Location and DOW (A,W,M); Summary by Toll Free Number, Service Location and Week (A,M); Summary by Service Location and Hour (A,D,W,M); Summary by Service Location and Date (A,D,W,M); Summary by Service Location and DOW (A,W,M); Summary by Service Location and Week (A,M); Summary by Service Location, Toll Free Number and Hour (A,D,W,M); Summary by Service Location, Toll Free Number and Date(A,D,W,M); Summary by Service Location, Toll Free Number and DOW (A,W,M); Summary by Service Location, Toll Free Number and Week (A,M). The Toll Free Summary Reports generally comprise three sections: Summary, Incomplete Call Analysis, and Network Customer Blocked Analysis (other category breakdown). The Termination Summaries include three types of termination reports: Toll Free by Location, i.e., showing termination summary and incomplete call analysis by service location for a specific Toll Free number; By Location, i.e., by service location across all Toll Free numbers terminating to the same service location; and, Location by Toll Free, i.e., for a specific service location, shows each Toll Free number terminating to this location. The originating NPA/Country Code summary reports provide information by NPA and Country for each Toll Free number attached to the report.

Additionally available are what are called Call Detail Exception Reports/images which provide reporting information pertaining to the following: Completion Rate and Retry (A,D,W,M); Completion Rate and Retry with Queue Abandonment (A,D,W,M); Lost Caller and Retry (A,D,M); Lost Caller and Retry with Queue Abandonment (A,D;M); Most Frequent Calling Numbers (A,D,W,M); Most Frequent Calling NPA/NXX (A,D,W,M); Most Frequent Calling Country (A,D,W,M).

The nMCI Interact Exception reports (images) includes: Completion Rate and Retry (A,D,W,M); Completion Rate and Retry with Queue Abandonment (A,D,W,M); Lost Caller and Retry (A,D,M); Lost Caller and Retry with Queue Abandonment (A,D,M); Most Frequent Calling Numbers (A,D,W,M); Most Frequent Calling NPA/NXX (A,D,W,M); and, Most Frequent Calling Country (A,D,W,M). The nMCI Interact Exception reports (data) includes: Call Detail by Originating ANI (A,D,W,M); Call Detail by ID Code (A,D,W,M); Call Detail by NCR Indicator (A,D,W,M); Call Detail by Originating State (A,D,W,M); Call Detail by Disposition (A,D,W,M); Call Detail by Service Location (A,D,W,M); Payphone Summary (A,M). Downloadable nMCI interact Call Detail reports includes Traffic view call detail (available as adhoc and daily) and Outbound traffic view call detail data (available as ad-hoc, daily and weekly).

As mentioned, via TCP/IP messaging, the TVS system 550 receives a request in real-time from the rIMCI Interact StarOE component 285 to begin collecting call detail records for a particular TVS/Unpriced reporting customer, which number had been previously assigned during the order entry process. When a customer discontinues Unpriced Reporting for a number, this information is entered in StarOE tables where it is stored for a predetermined period subsequent to termination of the number. After the predetermined period of time, e.g., seven days, the numbers scheduled for service deletion are passed to TVS via TCP/IP connectivity in real time. After receiving this information, TVS instructs the GSE 504 in real time to stop collecting CDRs for these numbers.

Figure 9:
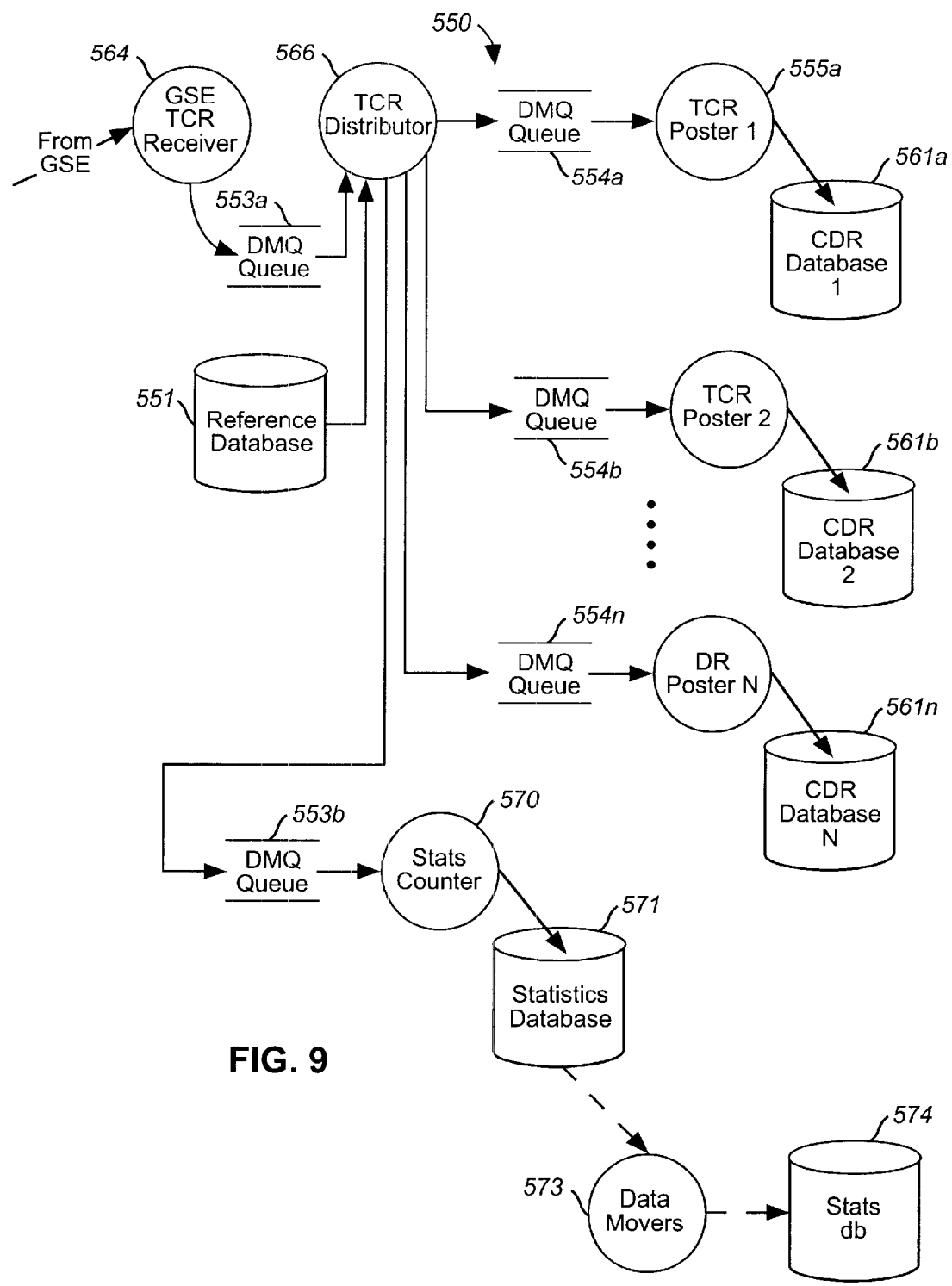
FIG. 9 is a high-level diagram depicting TCR data flow between processes internal to the TVS server.

FIG. 9 illustrates a generalized block diagram detailing the internal TVS data acquisition processes. As shown in FIG. 9, a TVS server "GSE_TCR_RCVR" process 564 receives a group of TCR records from the GSE component 504. The GSE_TCR_RCVR process 564 inserts that group into a DMQ (DecMessageQueue) queue 553a that provides a guaranteed message delivery. Upon successful storing of a record into the DMQ queue 553a, the GSE_TCR_RCVR process 564 sends an acknowledgment to the GSE component 504 so that it may delete that group. If TVS fails to acknowledge this group after a predetermined timeframe, the GSE continues to resend this group until an acknowledgment is received. The TCR_DISTRIB process 566 reads groupings of records and distributes a record based on the toll-free number associated with that record in the following manner:

First, as the reference database 551 contains information on which toll-free number belongs in which CDR database associated with the TVS server, records are grouped for each CDR database 561a,561b, . . . ,561n, to which they belong. The reference database 551 additionally flags which numbers are to have statistics collected for them. Thus, an additional group of records is created and may be routed to a DMQ Queue 553b which inputs these records into a statistics "stats" counter process 570 for statistics processing, as will be described in greater detail herein. When all the records in the group have been read, each group is written to it's DMQ queue 554a,554b, . . . ,554n associated with its destination database CDR Database 561a, 561b, . . . ,561n. For instance, via a TCR Poster process 555a, records destined for CDR database 561a are forwarded from the DMQ Queue 554a. Particularly, each CDR poster process 555a, 555b, . . . ,555n reads data from it's corresponding DMQ Queue and formats & stores those records in their database.

With further regard to the stats counter 570 shown in FIG. 9, TCRs are rolled up into statistics records. Specifically, the stats counter 570 keeps counts of the following: summary information about each toll free number for an hour; summary information about each toll free number and termination for an hour; and, summary information about each toll free number and origination NPA for an hour. These statistics are kept in memory for a pre-determined amount of time, e.g., one hour. As matching records come in, statistics are updated. At the end of the time period, these records are written to the statistics database 571, and particularly high speed electronic data drives.

The statistics that are gathered for each subscriber's toll-free number in the TVS system of the invention include: total completions, total call duration, total attempts, total switch control call, total Network Control System (NCS) blocked, total NCS rejected, total network blocked (all routes busy), total supp code blocked, and out-of-band blocked. The summary table processing algorithm in Appendix B details the collection of these statistics by the GSE and the TVS summary table processing.

Additionally, statistics gathered for NP table processing include: originating NPA, total attempts per NPA, total calls completed (tcc) per NPA, total call not delivered (blocked) per NPA, total attempts for International Originations, tcc for International Originations ("IO"), total calls not delivered (blocked) for IO.

Additionally, call statistics for terminations include: termination type, termination address, total completions, total call duration, and call dispositions indicating the cause of an incomplete call including: total short calls, total didn't write, and total didn't answer. The termination table processing algorithm in Appendix B details the collection of these statistics by the GSE for the TVS termination table processing.

Referring back to FIG. 6, the RTM system 600 of the invention enables customers to view in real time, their call detail statistics, over the Internet via TCP/IP connections 292 and 294 in real-time, via the nMCI Interact's web-based front-end and middle-tier infrastructure. As shown, customer requests are entered by the customer 100 via an RTM graphic user interface and communicated over secure TCP/IP socket connections for input over the firewall 250 to at least one secure server, e.g., a DMZ RTM Web Server 52 (FIG. 2) that provides for authentication, validation, and session management in the manner as described in co-pending U.S. patent application Ser. No. 09/159,408, filed Sep. 24, 1998 entitled AUTHENTICATION AND ENTITLEMENTS FOR USERS OF WEB BASED DATA MANAGEMENT PROGRAMS, the contents and disclosure of which is incorporated by reference as if fuilly set forth herein. Particularly, the RTM server 52 communicates with the Dispatch server 26 to perform an authentication check comprising a look-up based on the logon user name and the session ID, i.e., cookie, before enabling real-time monitoring functionality.

Figure 10A:
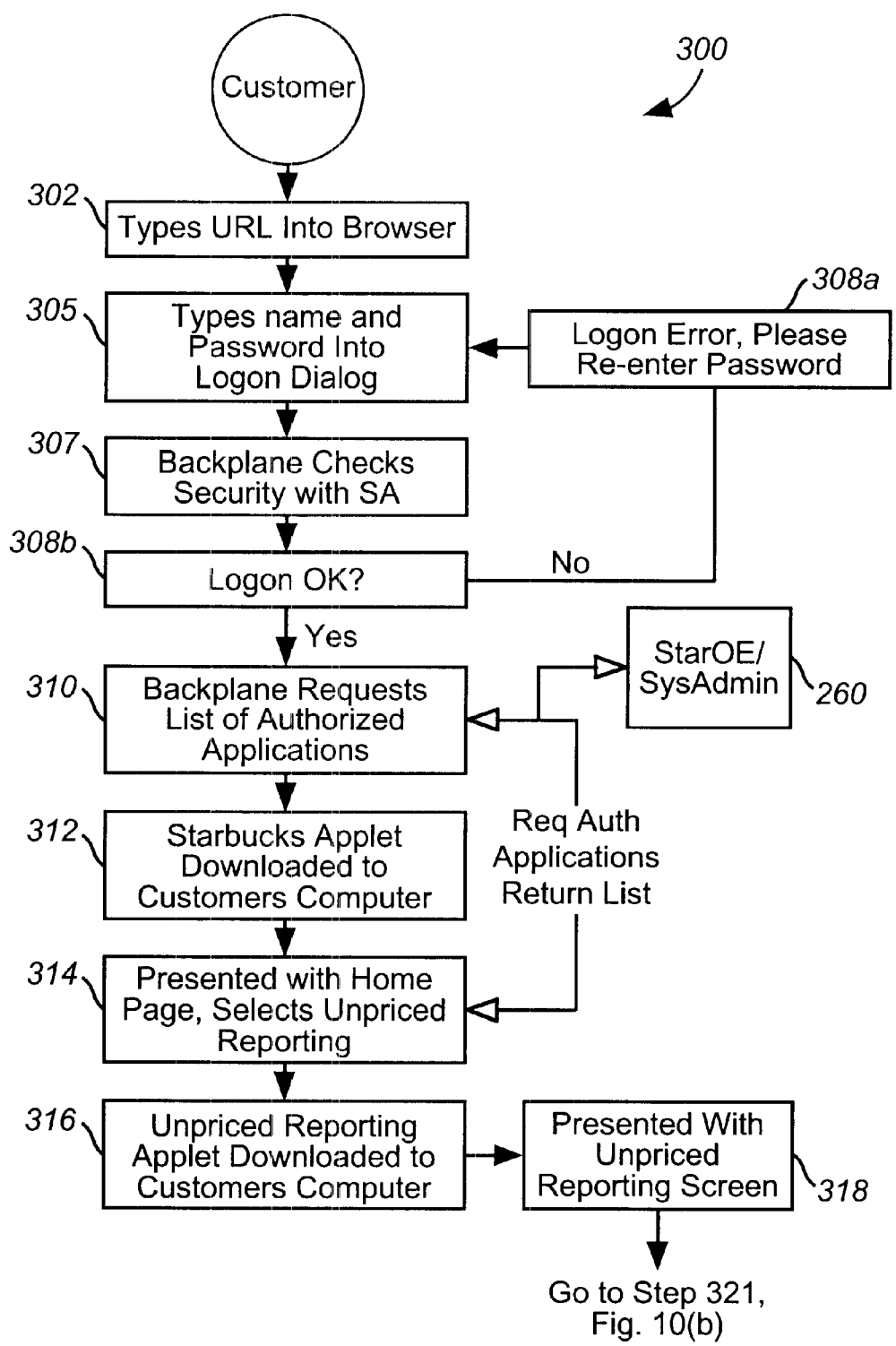
FIGS. 10(a)–10(c) illustrate flow charts describing the real-time monitoring process of the invention.

As shown in the process flow diagram of FIG. 10(a), a customer first establishes communication with the DMZ Web server at step 302 and logs on to the nMCI Interact reporting system by entering the user's name and password onto a logon dialog box, as indicated at step 305. Having accessed the web page and logged in, a user Common Object is created. As indicated at step 307, an application running on the backplane directs a "Validate User Message" to the StarOE server 280 via the web server (FIG. 6) to direct the StarOE server 280 to perform security validation and authenticate the user ID and password in the manner as described in co-pending U.S. patent application Ser. No. 09/159,408 filed Sep. 24, 1998, the contents and disclosure of which is incorporated by reference herein. It is understood that all communication to the StarOE server is via TCP/IP with a Unix process listening on a known TCP port. All data and security information is accessed by direct queries to a StarOE server database 283, such as provided by Informix.

Once the customer is validated, at step 308*a,b,* the backplane objects request a list of all the authorized applications from the StarOE server, as indicated at step 310. Particularly, as described in co-pending U.S. patent application Ser. No. 09/159,515 filed Sep. 24, 1998, the contents and disclosure of which is incorporated by reference herein, a "Get User Application Request" message is communicated to the StarOE server via the backplane which queries the Informix database to obtain a list of authorized applications, i.e., services, for the user and which determines which buttons on the home page are active, thus controlling their access to products. At steps 312 and 314 respectively, a networkMCI Interact applet is downloaded to the customers Web Browser via the established TCP/IP connection, and the browser presents the customer with the networkMCI Interact system home page, such as the exemplary home page 80 shown in FIG. 4. It should be understood that in the preferred embodiment, the icons for applications the user has security access to are shown bolded. Thus, it should be understood that if the customer subscribes to Real Time Monitor, a Traffic Monitor icon is automatically enabled when the home page appears.

Referring back to FIG. 10(*a*), at step 314, the customer selects the Traffic Monitor application from the home page by clicking on a Traffic Monitor icon 96 (FIG. 4) after StarOE validates the user's id and password in the manner as described in co-pending U.S. patent application Ser. No. 09/159,404, filed Sep. 24, 1998.

Referring back to FIG. 10(*b*), preferably, in response to selecting the RTM function, at step 321, a hot link connection to the TVS CGI/HTML implementation of RTM is made to initiate a second security/authentication process and verify the Unpriced data RTM products for which the customer is provisioned. With more particularity, the user connects to the RTM URL and checks the RTM Web Server implementing an HTTP Post method. In response, the RTM Web Server generates a cookie and implements the RTM Web Server common gateway interface protocol ("CGI") to send a validation request to TVS via TCP/IP with the cookie. TVS server 550 validates the logon request provided in the Traffic View server and confirms the customer is enabled for RTM, as indicated at step 329. The TVS server stores user information with the cookie, and returns the validation information to the Web Server. Next, via CGI, an HTML page is sent to the user as indicated at step 331 presenting the user with an RTM screen and menu options, as indicated at step 335, thus allowing customer access to all RTM functionality which that user is entitled. As will be explained, this functionality includes interaction with the RTM application to formulate and transmit requests and receive the results. For example, the user may select the toll-free numbers to be tracked, enter a polling period, and define the call detail statistics desired.

Particularly, selection of the traffic monitor icon enables display of the traffic monitor profile list page 600, shown in FIG. 12(*a*), which presents a list of the user-defined profiles 602 for which real time monitoring functions 603 may be invoked. Particularly, from the web page 600, a user may activate a real time monitoring function by selecting an activate button 604, edit an existing RTM profile by selecting button 606, or delete an existing RTM profile by selecting button 608. Additionally, a user may create a new RTM profile for a new toll-free number, by selecting an add profile button 610.

Upon selection of the add profile button 610, a new dialog window 620, such as the example window shown in FIG. 12(*b*), is presented which may allow a customer to enter desired RTM profile parameters for a selected toll-free (inbound) number 625*b* including: a profile name 622, a time zone 624, and, a polling interval 626, which specifies the time interval in which statistics data is to be gathered by the GSE and which, in the preferred embodiment, may be down to a one (1) minute interval. Particularly, a customer may be presented with a list of available numbers 625*a* from which a number may be selected for profile generation.

It should be understood that a profile selected from the profile list page 600 (FIG. 12(*a*), may be edited upon selection of a profile edit button 606. An edit profile page will be presented to the customer that is similar to the add profile page 620 (FIG. 12(*b*)). Thus, from the dialog shown in FIG. 12(*b*), the profile parameters of an existing RTM profile for a particular number, may be modified.

Referring back to FIG. 12(*a*), upon selection of the activate button 604 for a selected profile, an active profile web page 630 will be displayed, such as shown in FIG. 12(*c*), which presents the real-time summary data for the selected toll free number/profile. As shown in FIG. 12(*c*), the active profile web page 630 is broken down into three sections: a first section 632 displaying profile summary data for the selected toll-free number including call attempts, call completes, call incompletes, blocked, NCR, average duration and total duration; a second section 634 displaying a summary breakdown of the call incompletes for the selected profile including busy, (all trunks busy) ATB, short calls, didn't waits, or didn't answers; and, a third, section 636 displaying other summary data not presented in the first two sections such as network congestion, ID codes, payphone blocked, etc. It is from this screen that a customer may view real-time information pertaining to their toll-free network usage, and make informed business decisions regarding call-routing plans.

As further shown in FIG. 12(*c*), the customer may select a start time button 640 enabling selection of a specific time for which real-time traffic statistics are to be gathered for presentation to the customer. Thus, upon selection of the start time button 640, a set start time web page 650 will be displayed, such as shown in FIG. 12(*d*), which enables specification of a start date from a dropdown menu 652, and specification of a start time from a drop-down menu 654.

Likewise, as further shown in FIG. 12(*c*), the customer may select a polling interval specifying the time interval at which the summary data displayed on the active profile web page may be updated. Thus, upon selection of the start time button 642, a set polling interval page 660 will be displayed, such as shown in FIG. 12(*e*), enabling selection of a polling interval, e.g., in minutes, from a drop-down menu 662, for which real-time, statistical network traffic data is to be refreshed for display on the active profile page 630 (FIG. 12(*c*)).

Furthermore, as shown in the active profile page display of FIG. 12(*c*), the customer may select an Inquiry button 644 enabling a display of selected RTM call disposition parameters for the current selected RTM profile. Thus, upon selection of the inquiry button 644, an inquiry request page 670 will be displayed, such as shown in FIG. 12(*f*), enabling further inquiry selection/and or modification of RTM parameters for the selected profile 602 including: the inbound telephone number, start date, end date, report size limit, time zone, start time and end time. Additionally, further call disposition parameters 672 may be inquired into for display in the active profile page of FIG. 12(*c*) including: call answered, supp code blocked, switch control blocked, dialed number failure, ring no answer, out of band blocked, network blocked, range privilege failure, didn't wait, (network control system) NCS reject, busy, payphone blocked, didn't answer, NCS blocked, and all trunks busy. Particularly, upon selection of the submit button 674 of display 670, an inquiry results page 680 will be presented, such as shown in FIG. 12(*g*), which displays the collected raw real-time call detail statistic data 685 in display line format 685 for the selected RTM profile.

As further shown in FIG. 12(*g*), the customer may select a CDR detail link 687 to invoke a display 690 showing the details of a specific call detail record, such as the example display 690 shown in FIG. 12(*h*). Likewise, the customer may select an enhanced voice services (EVS) detail link 689 to invoke a display 695 presenting the selected EVS details, such as shown in the example EVS detail data display 690 shown in FIG. 12(*i*).

Referring back to FIG. 10(*b*), from the profile list page 600, the customer is enabled to select or modify his/her predefined RTM use profile, as indicated at step 340, FIG. 10(*b*). Thus, as mentioned, the customer may create or edit their user profile, for example, by entering selection criteria such as: 800/8xx or Vnet number to report, a polling interval, and time zone. The user may also delete a user profile. The entered selection criteria may be saved by the subscriber as a new user profile for storage in TVS server Level_of_use tables (not shown), as indicated at steps 344 and 345, or submitted directly to the TVS server, as indicated at steps 349 and 350. It should be understood that all TVS RTM functionality as described in co-pending U.S. patent application Ser. No. 08/587,381 filed Jan. 17, 1996, entitled SYSTEM,AND METHOD THEREFOR OF VIEWING IN REAL TIME CALL TRAFFIC OF A TELECOMMUNICATIONS NETWORK, the contents and disclosure of which is incorporated by reference as if fully set forth herein, may be available to the customer.

Figures 10B, 10C:
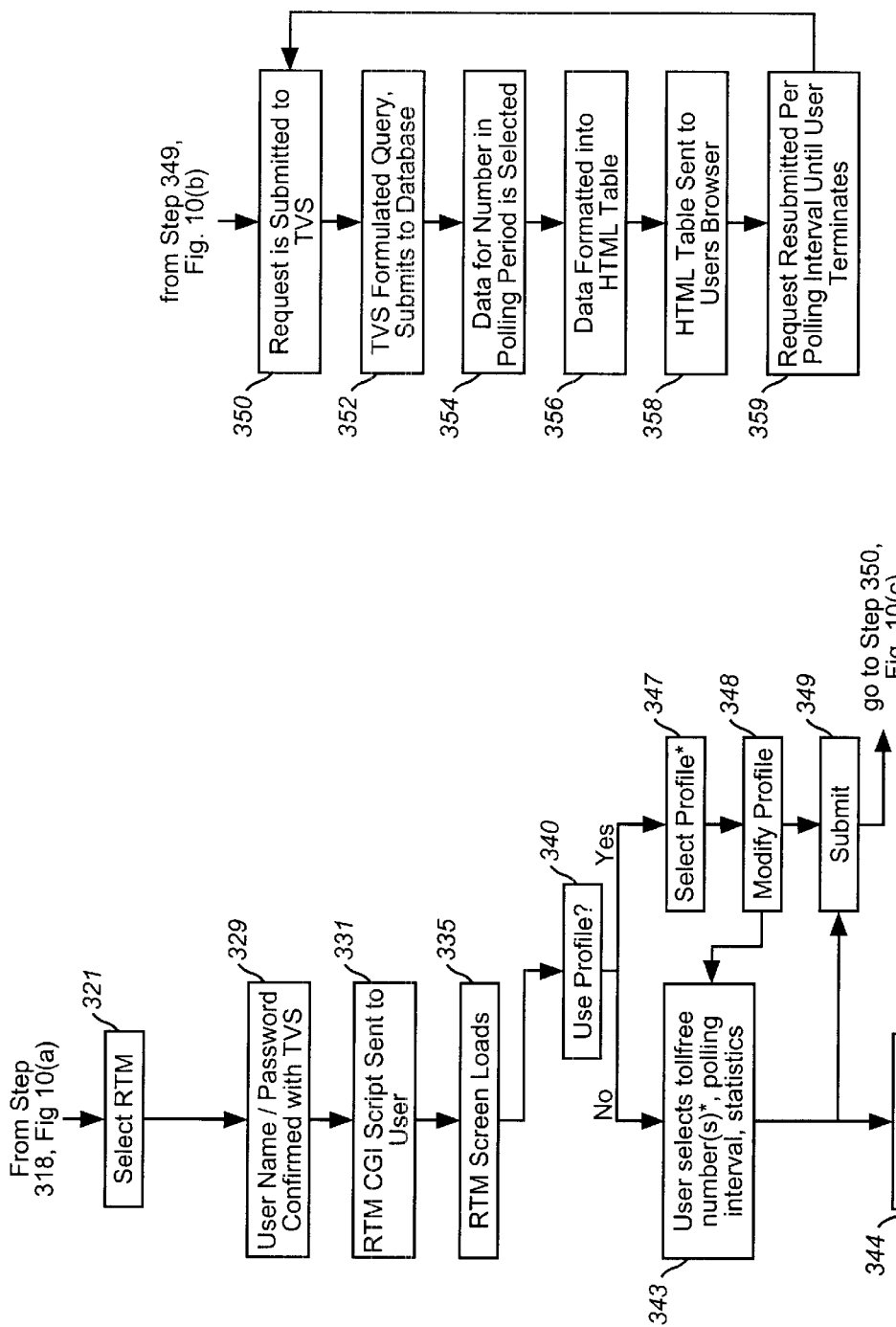

If, at step 340, the subscriber has selected a previously defined use profile, as indicated at step 347, the subscriber may modify the profile, i.e., 800/8xx or VNET number to report, start time, polling interval, and call disposition statistics, as indicated at step 348, and submit it directly to the TVS server, as indicated at steps 349 and 350 (FIG. 10(*c*)).

At this point, the user can interact with the RTM application to formulate a request, transmit it and receive the results according to the userselected toll-free number(s) to be tracked, polling period and defined statistics desired.

Briefly, after receiving the request, at step 352, FIG. 10(*c*), the TVS formulates a query and submits the query to the call detail database which is the repository of all call detail records for the particular number selected. The TVS server selects the call detail data in accordance with the user profile or selection at step 354, and passes the data to the RTM Web Server which formats the data into an HTML table, as indicated at step 356. This HTML table is sent to the user's browser at step 358 and the process continues at step 359 for each successive polling interval until the user terminates the request.

As mentioned, the networkMCI Interact Real-time Traffic Monitor provides a customer with a real-time summary display of calls made to their toll-free numbers. This information is displayed on the Active Profile page 630 such as shown in FIG. 12(*c*), which may be automatically refreshed at a specified polling interval of, e.g., 1 to 30 minutes. This value is selectable by the user upon profile creation. The information on the Active Profile page is refreshed at this interval by the user's browser (a "client information on the Active Profile page is refreshed at this interval by the user's browser (a "client pull" operation). This happens automatically because the Active Profile page contains an HTML Refresh meta tag which tells the user's browser software to redisplay the current page after the indicated number of seconds has passed.

Figure 11:
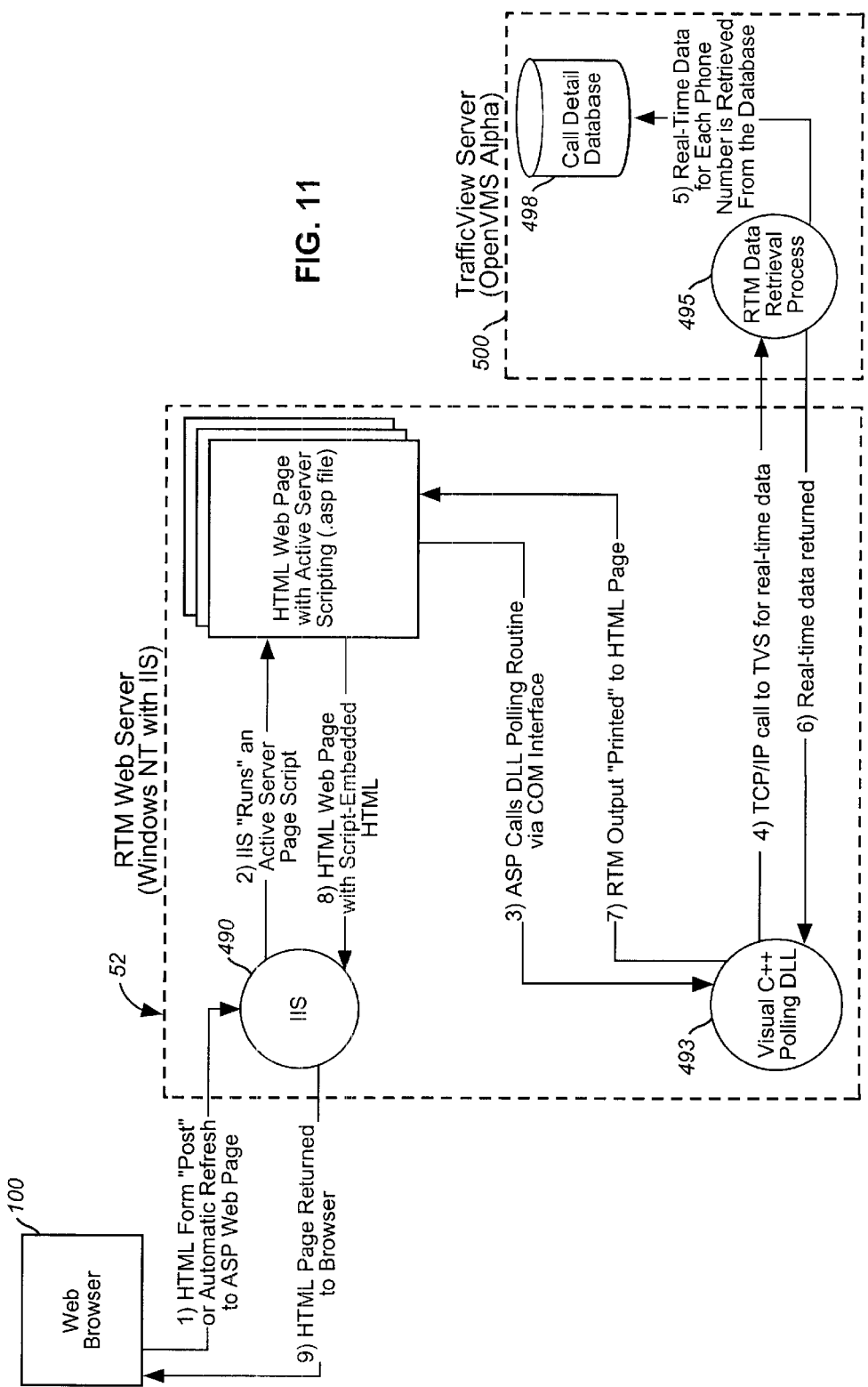
FIG. 11 illustrates the particular methodology employed for periodically updating a Web page with updated statistical data.
Figure 12A:
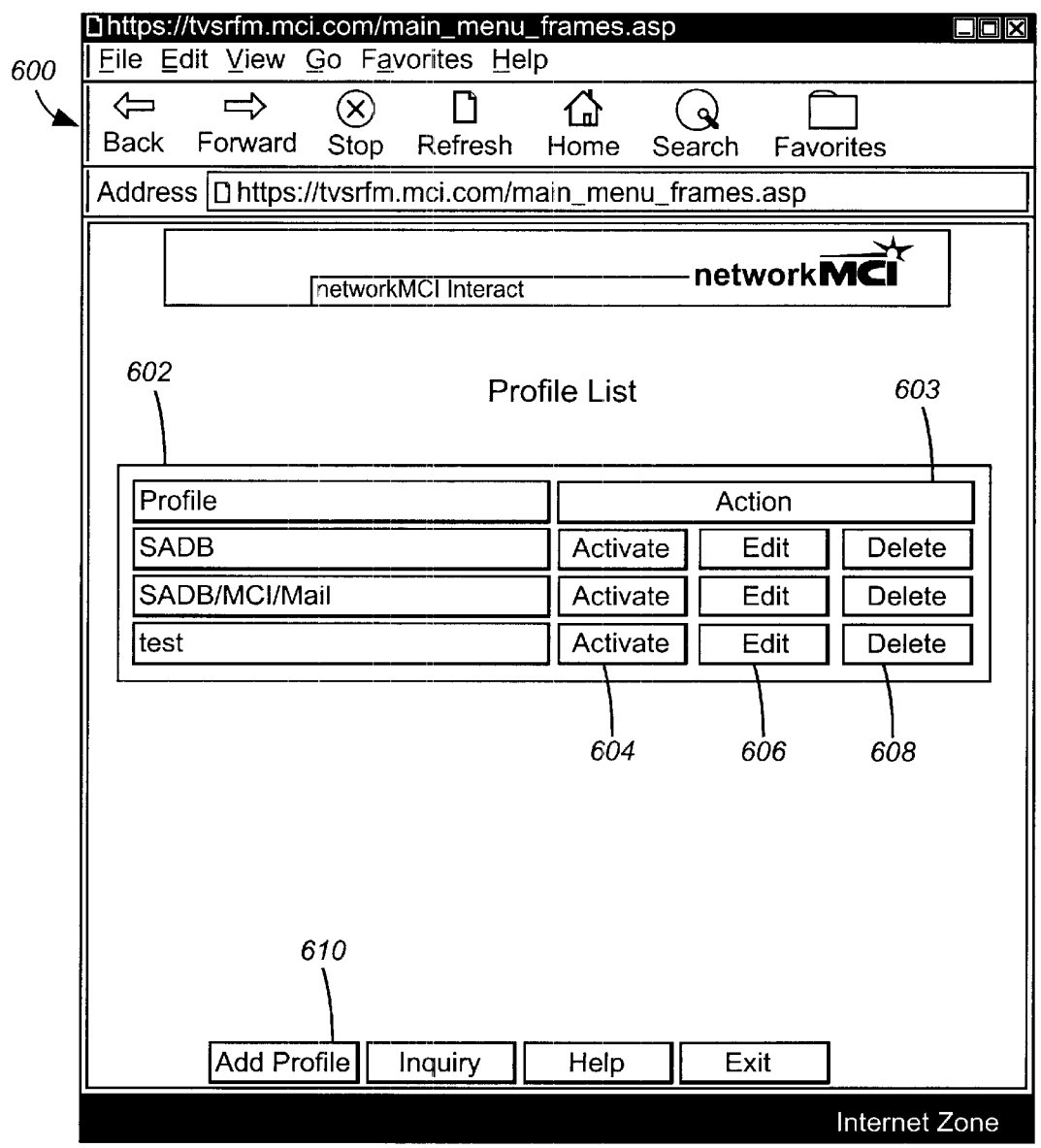
Figure 12B:
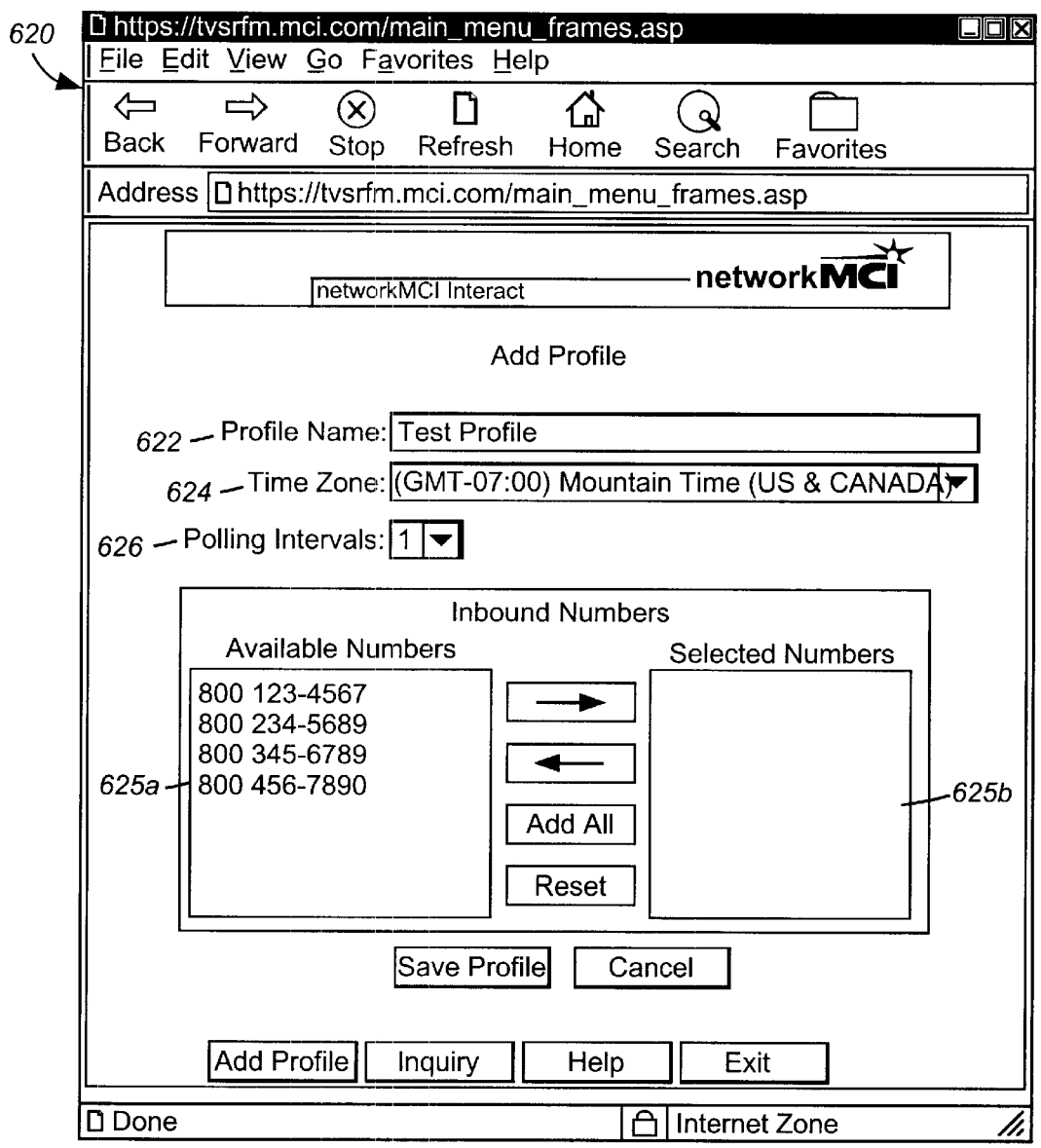
Figure 12D:
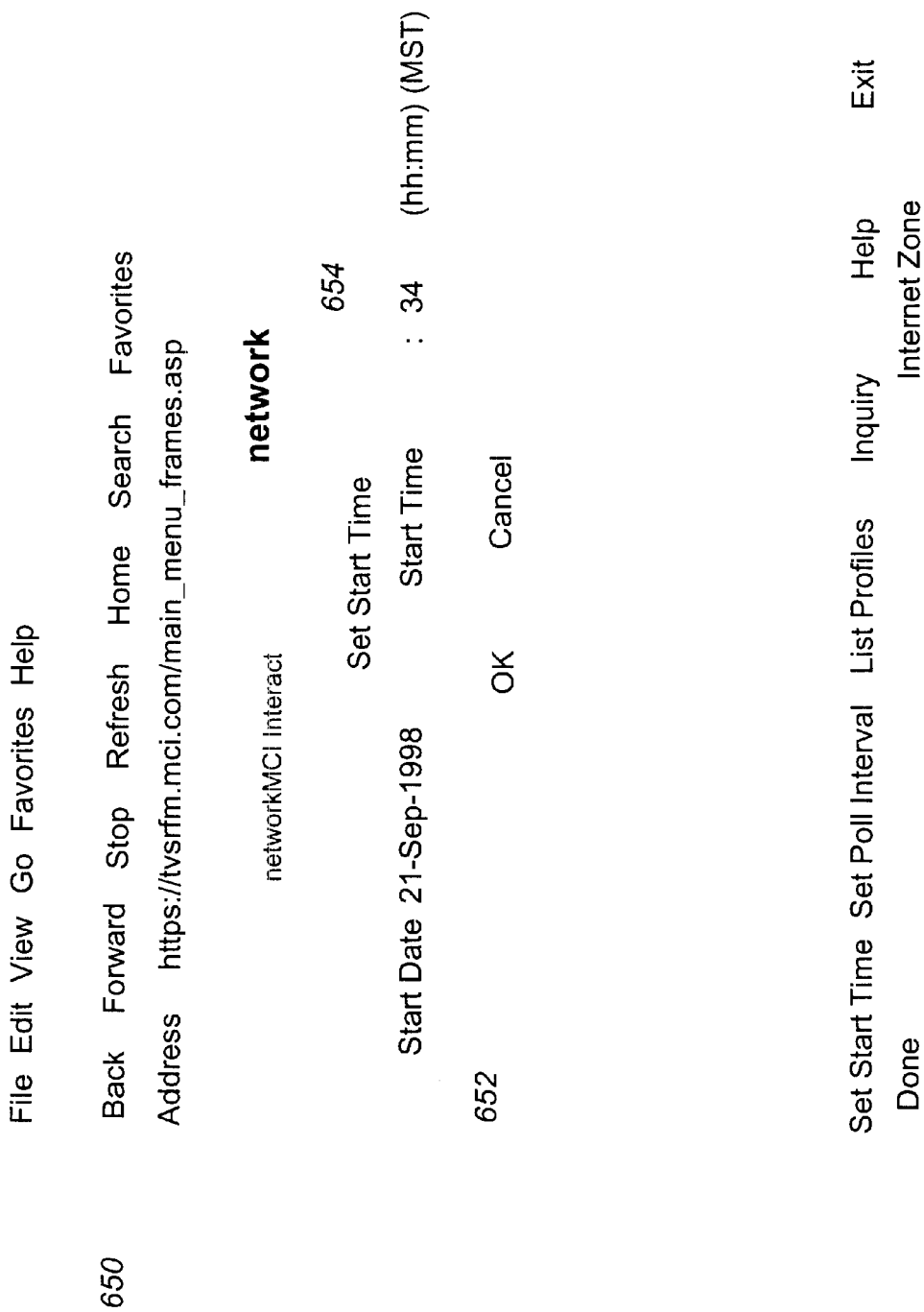
Figure 12E:
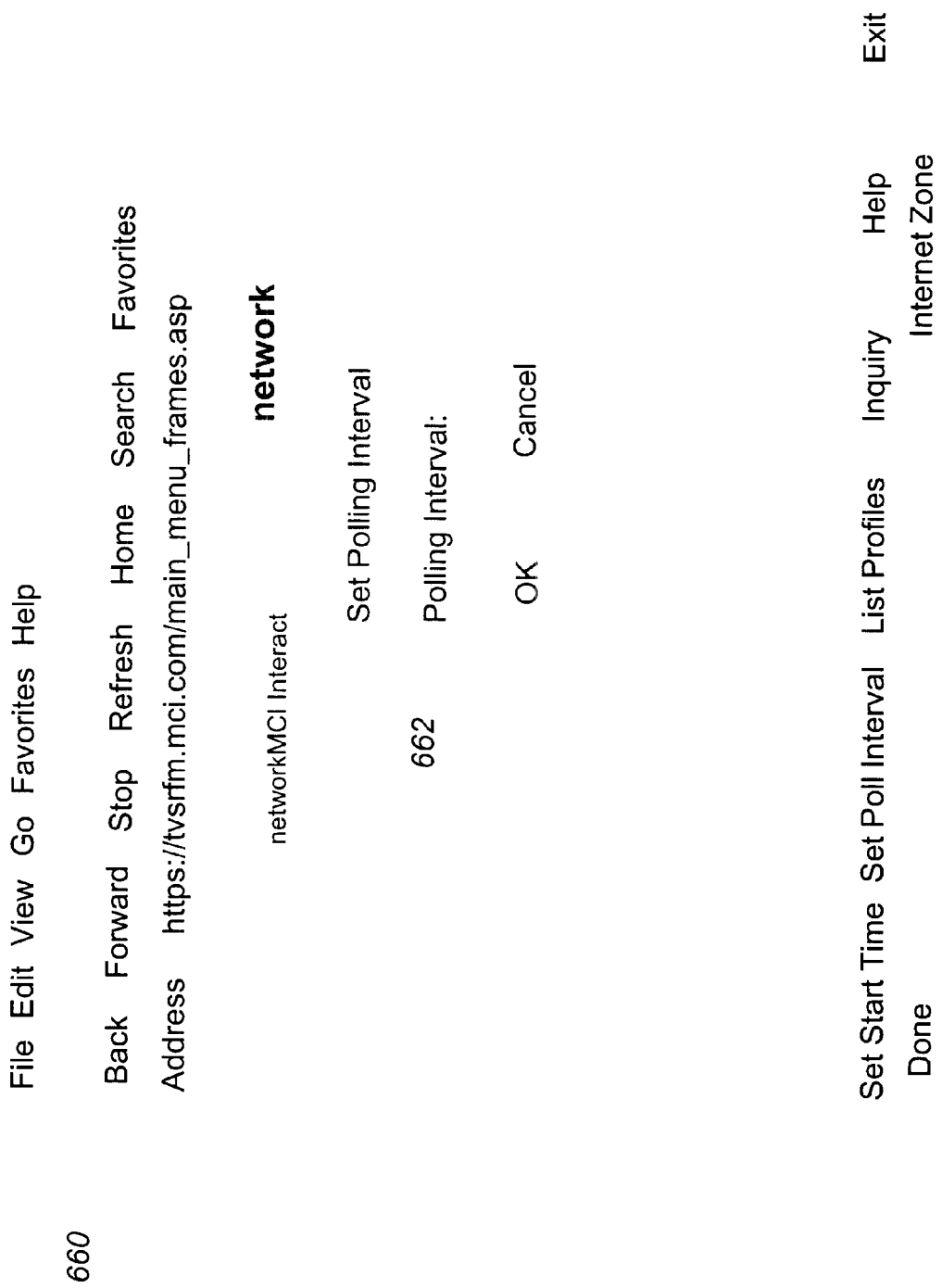
Figure 12H:
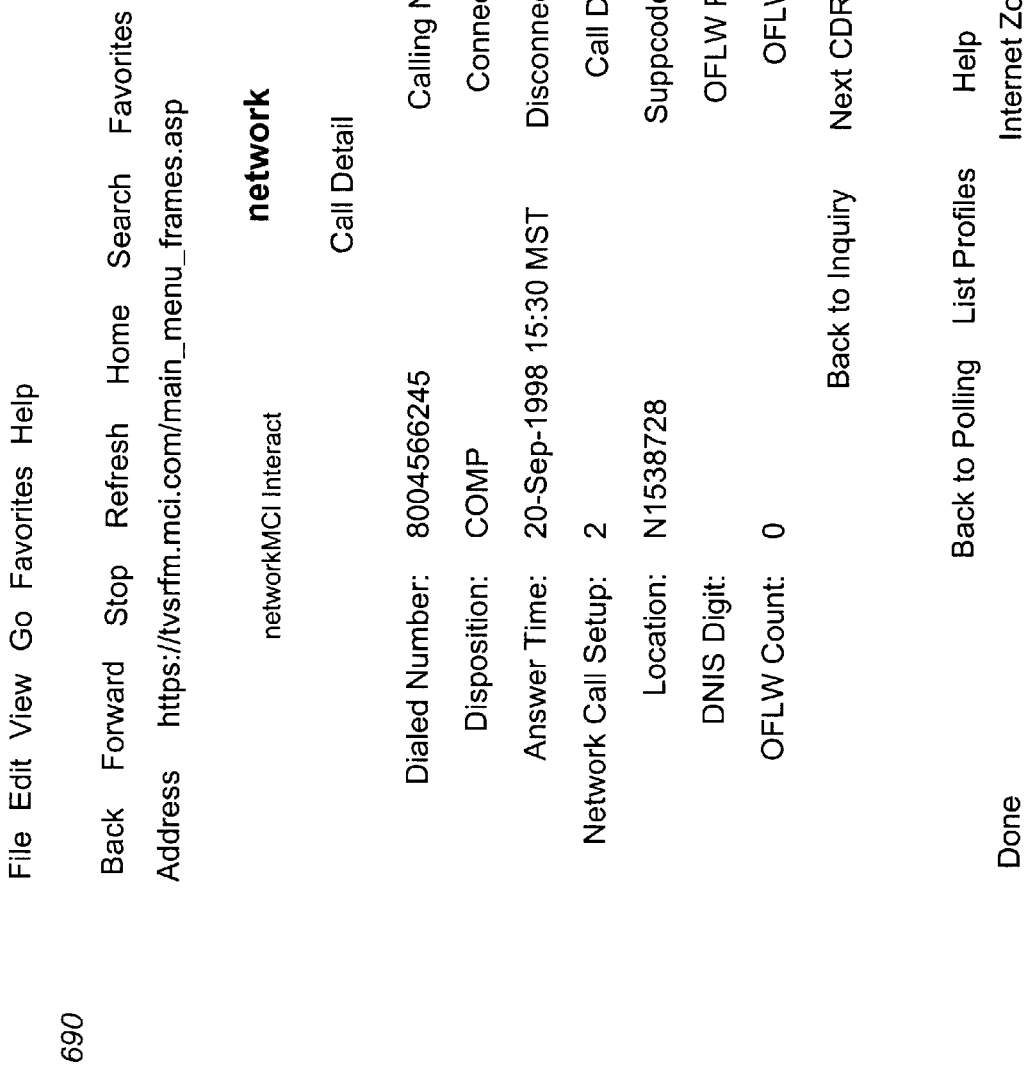
Figure 12I:
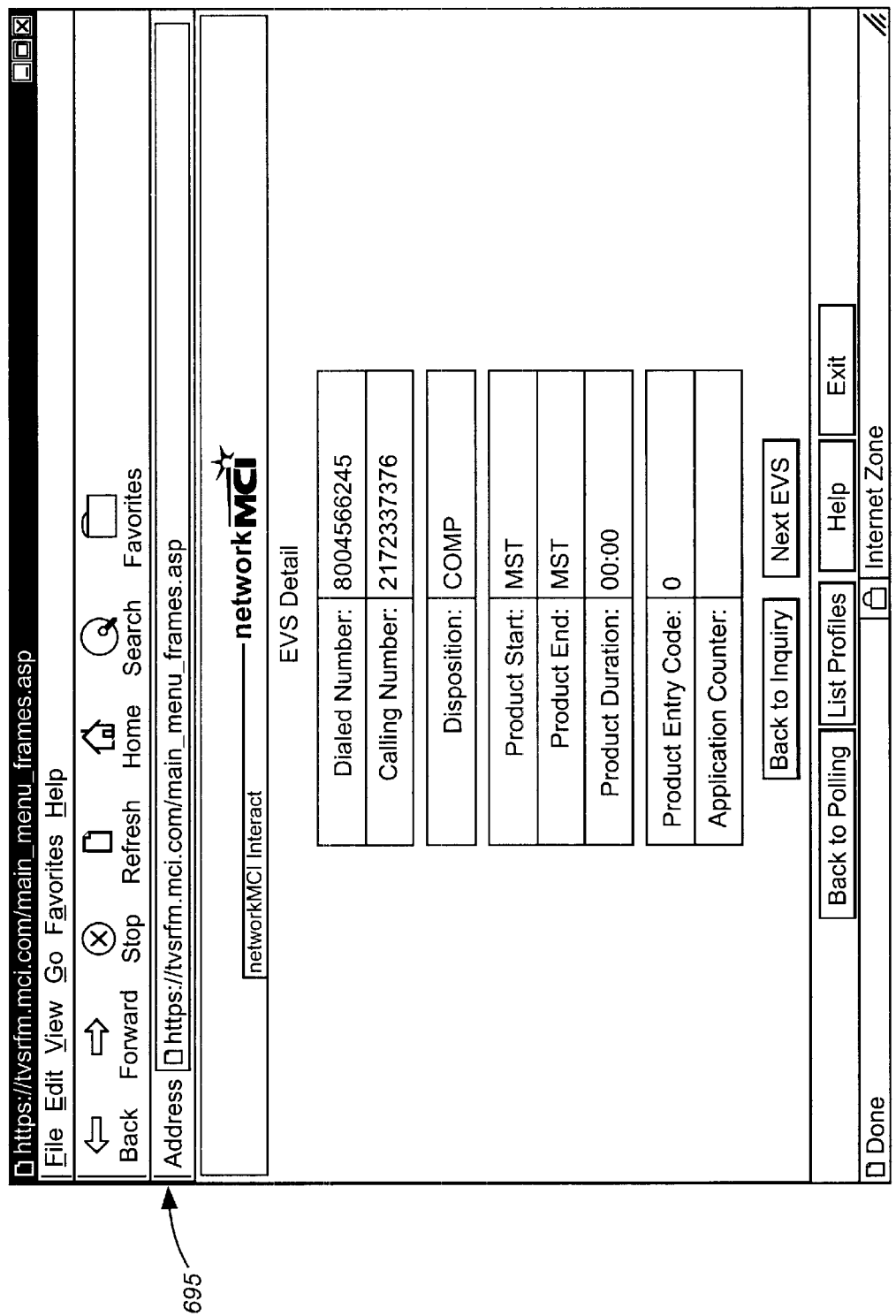

FIG. 11 is an illustration depicting the nMCI Interact RTM polling and refresh process. As shown in FIG. 11, the RTM system supports an HTML form "Post" or automatic refresh, to an active server page script. Thus, a Web page providing real-time call detail data has a user-selectable timeout interval, e.g., one minute or greater, at which point the Web browser 100 will re-post a request for data (HTTP Post). The Post request is received by an Internet Information (web) Server ("IIS") process 490 in the RTM server 52 that executes an active server page (".asp") script. This asp script calls a DLL polling routine 493 via a communications (COM) interface. This polling DLL is a Visual C++ application running in the RTM Web server 52. Upon receipt of the timeout request, the DLL calls the TVS server 550 for real-time call detail data retrieval via TCP/IP messaging. Particularly, the call detail request is received by a RTM data retrieval process 495 executing in the TVS server 500. Then, the real time data for each phone number (e.g., 800/8xx or VNET) is retrieved from the call detail database 498, which is the repository of real-time call detail data. The retrieved real time data is returned to the polling DLL process 493 and the current RTM output is formatted by the polling DLL and printed to the HTML page. The HTML page with the script-embedded HTML is then communicated back to the Web Browser 100 via the IIS process 490.

In the preferred embodiment, the RTM server application dynamically adjusts the number of seconds appearing in the meta tag of the summary display page, which feature allows the user's display to stay in sync with their selected polling interval regardless of how long the polling operation took for the last poll. When the user's browser requests a refresh, the data-retrieval software on the RTM web server 52 starts a timer. When the data-retrieval software has obtained the data necessary to lay out the next Active Profile page, it stops the timer. The page is then laid out with a Refresh meta tag containing a value of the polling interval less the amount of time, e.g., seconds, the data-retrieval process took. Finally, the page is sent back to the user's browser. For example, if the current profile has a 1 minute polling interval and the dataretrieval process took 3 seconds, then the next refresh will begin in 1 minute minus 3 seconds, or 57 seconds. During the next refresh, the data-retrieval process may take 5 seconds, in which case the next refresh will begin in 55 seconds. Without the dynamic refresh functionality, if the refresh rate were left at the full polling interval each time, the polling would drift forward in time.

In view of the foregoing, a subscriber via a client workstation running a Web browser can monitor in real time, or, in addition, using the RTM system, has the ability to monitor in substantially real time, the operation of the network as it relates to the calls directed to that subscriber's special service call number(s). For example, the subscriber may see in real time how many calls are being attempted minute by minute, how many calls are being allowed through the network, how many calls are incompletes, how many calls are blocked, etc. This ability to monitor the operation of the network gives the subscriber the ability to decide in real time the specific actions that need to be taken. For instance, if there is an abnormal number of incompletes for a given period, the subscriber can look at the specific call records that made up those incomplete calls. In the manner described in co-pending U.S. patent application Ser. No. 09/159,702, filed Sep. 24, 1998, the subscriber may then request the management of the network to restructure the network so as to reroute the incoming calls of the subscriber to different locations where they may better be handled.

The foregoing merely illustrates the principles of the present invention. Those skilled in the art will be able to devise various modifications, which although not explicitly described or shown herein, embody the principles of the invention and are thus within its spirit and scope.

APPENDIX A

| Field | Size | Type | Range |
|---|---|---|---|
| Length of Message | 4 Bytes | Unsigned Binary | The length of the message not including this field. |
| Message Type | 1 Byte | Unsigned Binary | 1 = TV Order Entry Request |
| Sequence Number | 4 Bytes | Unsigned Binary | When this header prefaces a data message, 0–4,294,967,295 with 0 = Reset. When this header serves as message delivery confirmation, set to the sequence number of the data message being "acked." |
| Message Type | 4 Bytes | Unsigned Binary | 1 = Data, 2 = Delivery Ack. |
| Order Entry Messages Sent From TVS to GSE ||||
| Message Type | 1 Byte | Unsigned Binary | 2 = GSE TV Order Entry Response |
| Version Number | 2 Bytes | Unsigned Binary | 961 = Version 96.1 |
| TV Order Entry Request ID | 4 Bytes | Unsigned Binary | 0–4,294,967,295 |
| Monitored Number Type | 1 Byte | Unsigned Binary | 0 = 8XX<br>0 = VNET DAL<br>1 = VNET DDD<br>2 = VNET IDDD<br>3 = VNET Card<br>4 = Remote Access to Vnet |
| Monitored Number Digits | 25 Bytes | ASCII | ASCII representation of up to 25 digits. Left justified, padded with ASCII nulls. |
| Corp ID | 4 Bytes | Unsigned Binary | 0–99,999,999 |
| 8XX Call Detail Service Indicator | 1 Byte | Unsigned Binary | 0 = Turn service off,<br>1 = Turn service on |
| 8XX Totals Statistics Service | 1 Byte | Unsigned Binary | 0 = Turn service off,<br>1 = Turn service on |
| 8XX Originating NPA Service | 1 Byte | Unsigned Binary | 0 = Turn service off,<br>1 = Turn service on |
| 8XX Originating Country Code Service | 1 Byte | Unsigned Binary | 0 = Turn service off,<br>1 = Turn service on |
| 8XX Termination Service | 1 Byte | Unsigned Binary | 0 = Turn service off,<br>1 = Turn service on |
| 8XX Statistics Destination | 1 Byte | Unsigned Binary | 1–6 = TV Server 1–6 |

APPENDIX A-continued

| Field | Size | Type | Range |
|---|---|---|---|
| 8XX Statistics Collection Interval | 2 Bytes | Unsigned Binary | 1–1,440 minutes |
| VNET Call Detail Service Indicator | 1 Byte | Unsigned Binary | 0 = Turn service off,<br>1 = Turn service on |

What is claimed is:

1. A Web/Internet based monitoring system for obtaining and communicating real-time telecommunication network traffic information relating to a customer's telecommunications network to a customer via an integrated interface, said system comprising:

a client browser application located at a client workstation for enabling interactive Web based communications with said monitoring system, said client workstation identified with a customer and providing said integrated interface;

at least one secure server for managing client sessions over the Internet, said secure server supporting one or more secure socket connections enabling encrypted communication between said browser application client and said secure server;

a device for generating statistical data based on real-time call data obtained from a telecommunications network, said statistical data being generated according to a pre-defined user profile;

a retrieval device for periodically retrieving said statistical data according to said user profile; and, a mechanism for integrating said retrieved statistical data within a Web page for presentation to said customer over a secure connection at pre-defined intervals based on the pre-defined user profile, said Web page being updated to include the latest statistical data each interval, the mechanism being further configured to dynamically adjust the pre-defined intervals.

2. The monitoring system as claimed in claim 1, wherein said device for generating statistical data includes polling means for obtaining said real-time call data from said telecommunications network, said user profile including a specification of polling interval.

3. The monitoring system as claimed in claim 2, wherein said user profile further includes the specification of one or more telecommunications network numbers for which statistical data are to be generated.

4. The monitoring system as claimed in claim 2, wherein said user profile further includes the specification of types of call detail statistics to be generated for a specified telephone number.

5. The monitoring system as claimed in claim 4, wherein said type of telecommunications network includes a customer's toll free network.

6. The monitoring system as claimed in claim 4, wherein said retrieval device for periodically retrieving said statistical data includes a script mechanism for initiating update of said web page with the most recent statistical data.

7. The system of claim 1 wherein said customer alters one or more network configurations based on said retrieved statistical data.

8. The system of claim 7 wherein said customer reallocates one or more network resources based on said retrieved statistical data.

9. A method for monitoring telecommunications network traffic in real-time and presenting corresponding telecommunications network traffic data to a client workstation via a Web/Internet-based integrated interface, said method comprising:

enabling interactive Web based communications between said client workstation identified with a customer and one or more secure servers over a secure communications link, said one or more web servers forwarding Web pages over said secure communications link;

generating statistical data based on real-time call data obtained from a telecommunications network, said statistical data being generated according to a pre-defined user profile;

periodically retrieving said statistical data according to said user profile;

integrating said retrieved statistical data within a Web page for presentation to said customer over said secure communications link at pre-defined intervals based on the pre-defined user profile, the pre-defined intervals being dynamically adjusted to prevent drifting of the intervals; and, updating said Web page to include the latest retrieved statistical data each interval.

10. The method as claimed in claim 9, wherein said step of generating statistical data includes polling said telecommunications network to obtain said real-time call data therefrom, said method further comprising the step of specifying a polling interval for said user profile.

11. The method as claimed in claim 10, further comprising the step of specifying one or more telecommunications network phone numbers for said user profile, said statistical data to be generated corresponding to a specified telecommunications network phone number.

12. The method as claimed in claim 11, further comprising the step of specifying types of call detail statistics to be generated for a specified telecommunications network phone number.

13. The method as claimed in claim 9, wherein said type of telecommunications network includes a customer's toll free network.

14. The method as claimed in claim 9, wherein said step of periodically retrieving said statistical data includes initiating an update of said Web page with most recent statistical data.

15. The method as claimed in claim 14, wherein said initiating step includes invoking a script within said Web page.

16. The method of claim 9 further comprising:
altering one or more network configurations based on said retrieved statistical data.

17. The method of claim 16 wherein the altering includes:
reallocating one or more network resources based on said retrieved statistical data.

* * * * *